(12) United States Patent
Hebrink et al.

(10) Patent No.: US 7,052,762 B2
(45) Date of Patent: May 30, 2006

(54) LOW TG MULTILAYER OPTICAL FILMS

(75) Inventors: Timothy J. Hebrink, Oakdale, MN (US); James M. Jonza, Woodbury, MN (US); Nagraj Koneripalli, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/139,893

(22) Filed: May 6, 2002

(65) Prior Publication Data

US 2003/0072931 A1    Apr. 17, 2003

Related U.S. Application Data

(60) Provisional application No. 60/293,294, filed on May 24, 2001.

(51) Int. Cl.
*B32B 7/00* (2006.01)

(52) U.S. Cl. ............... 428/212; 283/57; 283/58; 283/59; 283/94; 356/365

(58) Field of Classification Search ........... 283/57–59, 283/85–91, 94, 61–62, 72, 113–114; 356/365; 428/212
See application file for complete search history.

(56) References Cited

U.S. PATENT DOCUMENTS

| | | | |
|---|---|---|---|
| 4,162,343 A | 7/1979 | Wilcox et al. | 428/212 |
| 4,310,591 A | 1/1982 | Lee et al. | 428/283 |
| 4,536,016 A | 8/1985 | Solomon et al. | 283/111 |
| 4,838,648 A | 6/1989 | Phillips et al. | 350/166 |
| 4,896,901 A | 1/1990 | Ekelund | 283/90 |
| 4,914,178 A | 4/1990 | Kim et al. | 528/272 |
| 4,937,134 A | 6/1990 | Schrenk et al. | 428/213 |
| 5,026,592 A | 6/1991 | Janocha et al. | 428/204 |
| 5,070,180 A | 12/1991 | Fukuda et al. | 528/272 |
| 5,089,318 A | 2/1992 | Shetty et al. | 428/212 |
| 5,234,729 A | 8/1993 | Wheatley et al. | 428/30 |
| 5,339,198 A | 8/1994 | Wheatley et al. | 359/359 |
| 5,360,659 A | 11/1994 | Arends et al. | 428/216 |
| 5,393,099 A | 2/1995 | D'Amato | 283/91 |
| 5,424,119 A | 6/1995 | Phillips et al. | 428/328 |
| 5,466,520 A | 11/1995 | Krallmann et al. | 428/323 |
| 5,494,745 A | 2/1996 | VanderVelden | 428/354 |
| 5,536,468 A | 7/1996 | Leese | 264/446 |
| 5,552,927 A | 9/1996 | Wheatley et al. | 359/359 |

(Continued)

FOREIGN PATENT DOCUMENTS

AU    488652    4/1976

(Continued)

OTHER PUBLICATIONS

Encyclopedia of Polymer Science and Engineering, vol. 5, p. 91-94, Wiley-Interscience, New York, 1986.

(Continued)

*Primary Examiner*—Deborah Jones
*Assistant Examiner*—G. Blackwell
(74) *Attorney, Agent, or Firm*—Melissa E. Buss

(57) ABSTRACT

Multilayer optical films are comprised of materials with glass transition temperatures below room temperature (<30° C.). The high refractive index polymers are unique in that they exhibit mechanical properties similar to other low Tg semi-crystalline polymers, yet have significant birefringence (>0.05) when strain induced oriented. Novel combinations of comonomers for thermoplastics control the rate of crystallinity for improved processability and flexibility, giving the films crease and crumple recovery advantages.

36 Claims, 8 Drawing Sheets

U.S. PATENT DOCUMENTS

| | | | |
|---|---|---|---|
| 5,618,630 A | 4/1997 | Benoit et al. | 428/500 |
| 5,698,333 A | 12/1997 | Benoit et al. | 428/516 |
| 5,716,695 A | 2/1998 | Benoit et al. | 428/195 |
| 5,879,028 A | 3/1999 | Benoit | 283/72 |
| 5,882,774 A | 3/1999 | Jonza et al. | 428/212 |
| 5,935,696 A | 8/1999 | Benoit et al. | 428/219 |
| 6,045,894 A | 4/2000 | Jonza et al. | 428/212 |
| 6,062,604 A | 5/2000 | Taylor et al. | 283/72 |
| 6,157,489 A | 12/2000 | Bradley, Jr. et al. | 359/584 |
| 6,184,332 B1 | 2/2001 | Dos Santos | 528/81 |
| 6,224,664 B1 | 5/2001 | Muller-Rees et al. | 106/493 |
| 6,268,961 B1 | 7/2001 | Nevitt et al. | 359/488 |
| 6,369,945 B1 | 4/2002 | Sakuramoto et al. | 359/494 |
| 2001/0008700 A1 | 7/2001 | Jonza et al. | 428/480 |
| 2002/0005986 A1 | 1/2002 | Hebrink et al. | 359/497 |
| 2002/0015836 A1 | 2/2002 | Jonza et al. | 428/216 |

FOREIGN PATENT DOCUMENTS

| | | |
|---|---|---|
| EP | 0860296 | 8/1998 |
| GB | 1 473 362 | 5/1977 |
| WO | 95/17691 | 6/1995 |
| WO | 97/01440 | 1/1997 |
| WO | 97/01774 | 1/1997 |
| WO | 98/13211 | 4/1998 |
| WO | 99/06203 | 2/1999 |
| WO | 99/36248 | 7/1999 |
| WO | 99/36257 | 7/1999 |
| WO | 99/36258 | 7/1999 |
| WO | 99/36809 | 7/1999 |
| WO | 99/36812 | 7/1999 |
| WO | 99/36813 | 7/1999 |
| WO | 99/36814 | 7/1999 |
| WO | 99/67092 | 12/1999 |
| WO | 99/67093 | 12/1999 |
| WO | 00/18575 | 4/2000 |
| WO | 00/74936 | 12/2000 |
| WO | 00/74948 | 12/2000 |
| WO | 01/02192 | 1/2001 |
| WO | 01/03945 | 1/2001 |

OTHER PUBLICATIONS

Noniewicz, K. et al., "Polyarylates as nonlinear optics materials", Reactive & Functional Polymers, Elsevier Science Publishers, vol. 33, No. 2-3, Aug. 1, 1997, pp. 343-349.

Rich, D.C., et al., "Alignment layer relaxation—a technique for assessing thermal transitions in polymer films", POLYMER, Elsevier Science Publishers, vol. 39, No. 26, Dec. 1, 1998, pp. 7135-7137.

- US $ NEW
- New MOF
- Australian $5
- Std. MOF

▲ Yellow dye absorption  
■ Normal Incidence  
◇ 60 degrees

◇ Yellow dye absorption  
■ Normal Incidence  
▲ 60 degrees

◇ Yellow dye absorption
■ Normal Incidence
▲ 60 degrees

◇ "Cyan" dye absorption
♦ MOF CM reflection

LOW TG MULTILAYER OPTICAL FILMS

CROSS-REFERENCE TO RELATED APPLICATION

This application claims priority to U.S. Provisional Patent Application No. 60/293,294, filed May 24, 2001.

FIELD OF THE INVENTION

This invention relates to polymeric multilayer light-reflecting optical films, wherein at least one of the polymers develops and maintains a large birefringence when oriented. In addition, the invention relates to multilayer optical films (MOF) that reflect light over a range of wavelengths (e.g., mirrors, color mirrored films, IR reflective films, reflective polarizers, and UV reflective films).

BACKGROUND OF INVENTION

Polymeric documents of value offer several benefits over their paper counterparts. In particular, polymeric banknotes can offer greatly increased durability and resistance to counterfeiting through the incorporation of security features. A requirement for polymeric banknotes is that certain physical properties are similar to the more commonly used paper banknotes. Those properties relate to tactile feel, strength, tear resistance, handling, folding, and crumple resistance.

In the past, laminates have been used for banknotes having biaxially oriented polymeric film and a non-printed window incorporate security features. However, there are several the shortcomings of banknotes based on some of the laminates. Laminate constructions primarily based on polyolefin film offer improved physical properties. Other alternatives include banknotes that incorporate outer layers of paper laminated to a polymeric core as a way to obtain paper-like properties.

Polymeric banknotes offer unique opportunities to incorporate security features that are designed to discourage counterfeiting. Many efforts relating to banknotes describe the possibility of a transparent window somewhere on the banknote, which offers a quick visual check for authenticity and is difficult to reproduce with copying techniques. Further refinements of the window include an optically variable device, such as a Moire pattern or diffraction grating, which is visible in the window. In most cases, the security feature must be added as a separate component with an additional process step.

Polymeric laminates having a large number of layers and exhibiting optically unique properties have been considered as a basis for "plastic" currency. Multilayered optical films with unique optical properties that can be used as security features on certain documents of value have been considered. Polymeric multilayer optical films have previously been made with PEN, PET, and CoPEN polymers (See for example, U.S. Pat. No. 5,882,774).

Researchers, however fail to address the physical properties required for that application. (See additional references U.S. Pat. Nos. 4,162,343, 4,937,134, 5,089,318, and U.S. Pat. No. 6,045,894.)

There would be great value in a multilayered film with optical properties that combines the physical properties required for polymeric banknotes with an inherent security feature that would be difficult to counterfeit.

SUMMARY OF INVENTION

Briefly, in one aspect, the present invention provides an optical film, comprising: (a) a plurality of first optical layers, each first optical layer being oriented and comprising high refractive index birefringent polymers, wherein such polymers have a Tg below room temperature; and (b) a plurality of second optical layers disposed in a repeating sequence with the plurality of first optical layers, each second optical layer comprising low refractive index polymers, wherein such polymers have a Tg below room temperature. The Tg of the polymers for both layers is below room temperature. Typically the Tg is <30° C., generally in the range of −100° C. to 30° C. Advantageously, such optical films exhibit excellent crease and crumple recovery. These mechanical properties, combined with their unique optical features make them particularly useful for documents of value, such as banknotes.

The novel multilayer optical films are comprised of materials with glass transition temperatures below room temperature (<30° C.). As described in U.S. Pat. No. 6,045,894, multilayer optical films comprise alternating layers of high and low refractive index polymers with thicknesses designed such that specific wavelengths of light are reflected. The high refractive index polymers disclosed by this patent are unique in that they exhibit mechanical properties similar to other low Tg semi-crystalline polymers, yet have significant strain induced birefringence (>0.05) when oriented. The high refractive index materials of this invention are copolyesters that are similar to semi-crystalline polyolefins in that they can be strain induced oriented near their melting points to induce birefringence, and are not glassy at room temperature, yet they have uniquely different optical properties.

If cast web crystallinity is minimized by quick quenching or copolymerization with sufficient quantity of comonomers, these low Tg copolyesters may alternatively be oriented at 30–40° C., which is slightly above their glass transition temperature. Novel combinations of comonomers for thermoplastics have been investigated which control the rate of crystallization for improved processability and flexibility. When oriented, these copolyesters develop birefringence at least 0.05 units greater than polyolefins, where birefringence is measured as a difference in refractive indices in two or more directions. In addition, the copolyesters have melting points below 200° C., which enables them to be coextrusion melt processed with low refractive index materials that have poor thermal stability at PEN or PET processing temperatures (260°–290° C.).

In another aspect, the invention provides an optical film, comprising: (1) a plurality of first optical layers, each first optical layer being oriented and comprising a polymer composition comprising the polymerization product of: (a) aromatic carboxylated comonomer units, and (b) a glycol having a carbon chain length of C6 and longer, wherein the polymer composition comprising the first optical layer has a Tg below 30° C. and the polymer is birefringent; and (2) a plurality of second optical layers disposed in a repeating sequence with the plurality of first optical layers, each second optical layer comprising low refractive index polymers and copolymers, such as polyolefins, polyurethanes, polysiloxanes, polyalkyl acrylates, and polyethers, having a Tg below room temperature. Generally, the refractive index for the first optical layer exhibits a strain induced birefringence of >0.05 when oriented and the second optical layer exhibits a birefringence of <0.05 or a birefringence of the opposite sign, when oriented under the same conditions as the first optical layer.

In another aspect, the present invention provides an improved polymeric composition for use as the first optical layer. This copolyhexamethylene terephthalate, also called CoPHT, comprises the repeatable polymerizable units of:

50–100 mol % terephthalate subunits and 0–50 mol % isophthalate, naphthalate, adipate, sebacate, or cyclohexanate as dicarboxylate comonomer subunits, and 50–100 mol % 1,6 hexane diol, 0–50 mol % longer chain diols, 0–50 mol % triethylene glycol, 0–50 mol % polyethylene glycol, 0–20 mol % ethylene glycol, 0–20 mol % neopentyl glycol, 0–20 mol % 2-butyl 2-ethyl 1,3 propanediol, and 0.1–10 mol % trimethylol propane or 0.1–10 mol % pentaerythritol as glycol comonomer subunits; preferably 80–100 mol % terephthalate subunits and 0–20 mol % isophthalate, naphthalate, adipate, sebacate, or cyclohexanate as dicarboxylate comonomer subunits, and 80–100 mol % 1,6 hexane diol, 0–20 mol % longer chain diols, 0–20 mol % triethylene glycol, 0–20 mol % ethylene glycol, 0–20 mol % polyethylene glycol, 0–20 mol % neopentyl glycol, 0–20 mol % 2-butyl 2-ethyl 1,3 propanediol, and 0.01–10 mol % branching comonomers such as trimethylol propane as glycol comonomer subunits.

Another embodiment of low Tg birefringent copolyesters comprise naphthalate as the major carboxylate subunit. These low Tg copolyesters would require either aliphatic carboxylate comonomer subunits and/or aliphatic diol comonomers that are C7 and longer to suppress the Tg below 30° C. This naphthalate based copolyester comprises the repeatable polymerizable units of:

50–100 mol % naphthalate subunits and 0–50 mol % adipate, azelate, sebacate, or longer chain dicarboxylate comonomers, and 0–100 mol % 1,6 hexane diol, 0–100 mol % C7 and longer chain diols, 0–20 mol % TEG, 0–20 mol % neopentyl glycol, 0–20 mol % 2-butyl 2-ethyl 1,3 propanediol, and 0.01–10 mol % branching comonomers as glycol comonomer subunits.

A particularly useful aspect of the present invention is an optical film comprising a first optical layer comprised of coPHT and a second optical layer comprised of a low refractive index olefin copolymer, having a Tg of less than 30° C.

Methods of making the above-described optical films, and articles employing such optical films are also provided.

These materials exhibit vastly improved crumple and crease recovery compared to previously known multilayer optical films, synthetic papers, or currency papers. The combination of a color shifting material in transmitted and reflected light coupled with the proper modulus and tear strength, superior folding endurance, and crumple and crease recovery properties fits the market need for an easily recognizable eye-visible security feature and increased durability. In the case where the entire banknote is made of the optical film of this invention, opacifying coatings may be used, leaving transparent windows with no opacifying coating.

The improved crumple and crease recovery properties of the present invention are such that the films of the present invention may be incorporated as security threads in paper or polymeric documents of value. For example, films of the present invention can recover from creasing and crumpling within 48 hours, preferably 24 hours. The measure for crease recovery is recovery to at least 140° following creasing under a 500 gram load over a 0.19 mm radius. The measure for crumple recovery is a ratio of crumpled to uncrumpled height of less than 8, following 24 hr recovery under 969 g load for a 67 mm square sample.

Advantageously, the films of the present invention provide security characteristics, such as color shifting and the like. These security threads could be printed with images or information, and could be from 0.5 to 10 mm in width. Additionally, information could be added to the security thread in the form of a narrow holographic image, a printed image, or a topographical feature, such as embossed numbers, characters or symbols. These characters or symbols have a color shift that is different from the surrounding, unembossed region of the color shifting film.

Alternatively, the security thread may be made from a polymeric multilayer optical film, wherein one or more of the polymers do not have glass transition temperatures below room temperature, provided that the film thickness is less than two thirds of the document thickness, preferably less than one third of the document thickness. In this case, the lack of crumple and crease recovery properties may not be required, since the stiffness of the thread is considerably reduced by the reduction in thread thickness. It should be noted that chemical resistance may be required for the use of these security threads in some applications. In addition to the choices of polymers exemplified in this patent application, the use of coatings, sealants or other additional layers with the desired chemical resistance may provide sufficient protection for the intended use.

The above summary of the present invention is not intended to describe each disclosed embodiment or every implementation of the present invention. The Figures and the detailed description, which follow more particularly exemplify these embodiments.

As used in this application:

"birefringent" means that the indices of refraction in orthogonal x, y, and z directions are not all the same. For the polymer layers described herein, the axes are selected so that x and y axes are in the plane of the layer and the z axis is normal to the plane of the layer and typically corresponds to the thickness or height of the layer. For an oriented polymer, the x-axis is generally chosen to be the in-plane direction with the largest index of refraction, which typically corresponds to one of the directions in which the optical film is oriented (e.g., stretched);

"dispersion" is the dependence of refractive index on wavelength;

"document" means any document of value, including, but not limited to, banknotes, identification documents, certificates of ownership, labels, and licenses;

"high refractive index" means the layer that has in-plane refractive indices larger than the low refractive index layer;

"polymer" means, unless otherwise indicated, polymers and copolymers (i.e., polymers formed from two or more monomers or comonomers, including terpolymers, etc.), as well as copolymers or polymers that can be formed in a miscible blend by, for example, coextrusion or reaction, including transesterification. Block, random, graft, and alternating polymers are included, unless indicated otherwise;

"room temperature" means an ambient temperature from 20 to 30° C.; and

"Tg" means the temperature at which a polymer transitions from a glassy to a rubbery state, as measured by differential scanning calorimetry (described below in Test Methods).

All birefringence and index of refraction values are reported for 632.8 nm light unless otherwise indicated.

DESCRIPTION OF THE PREFERRED EMBODIMENT(S)

Figure 1:
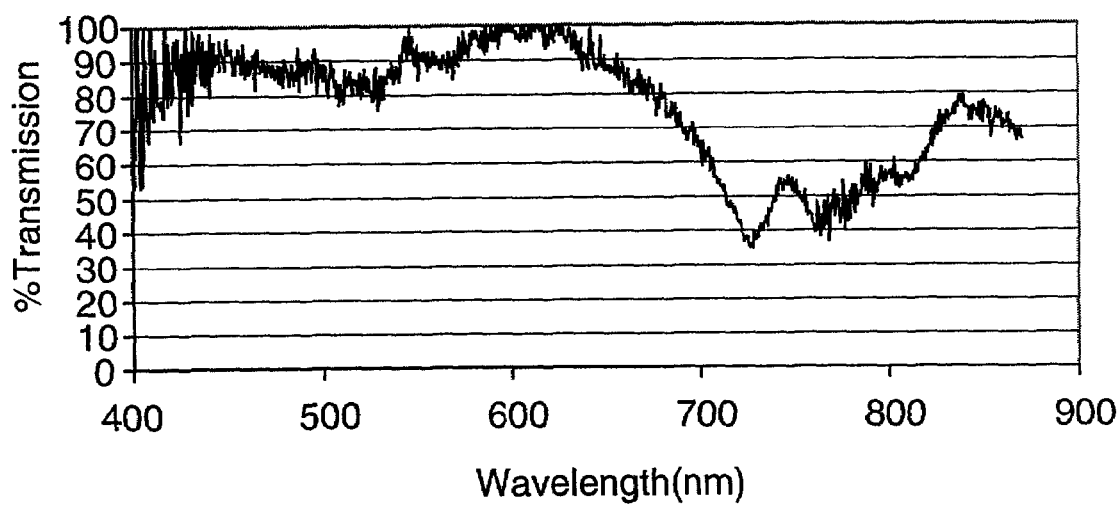
FIG. 1 is a graphical representation of % transmission vs. wavelength as described in Example 2.

The present invention is generally directed to multilayer optical films and their manufacture, wherein the multilayer optical films exhibit excellent crease and crumple recovery properties. The nature of the multilayer optical films also provides security features that provide a particularly unique advantage, when the multilayered optical films of the present invention are used for documents of value, such as banknotes. The multilayer optical films reflect light over a wavelength range (e.g., all or a portion of the visible, IR, or UV spectrum). The multilayer optical films are typically coextruded and oriented multilayer structures that differ from previous optical films, at least in part, due to the selection of materials which can provide processing, economic, optical, mechanical, and other advantages. While the present invention is not so limited, an appreciation of various aspects of the invention will be gained through a discussion of the examples provided below.

The present invention provides an optical film, comprising: (a) a plurality of first optical layers, each first optical layer being oriented and comprising high refractive index birefringent polymers, wherein such polymers have a Tg below room temperature; and (b) a plurality of second optical layers disposed in a repeating sequence with the plurality of first optical layers, each second optical layer comprising low refractive index polymers, wherein such polymers have a Tg below room temperature. The Tg of the polymers for both layers is below room temperature. Typically, the Tg is <30° C., generally in the range of −100° C. to 30° C. Advantageously, such optical films exhibit excellent crease and crumple recovery. These mechanical properties, combined with their unique optical features make them particularly useful for documents of value, such as banknotes.

Additionally, the invention provides an optical film, comprising: (1) a plurality of first optical layers, each first optical layer being oriented and comprising a polymer composition comprising the polymerization product of: (a) aromatic carboxylated comonomer units, and (b) a glycol having a carbon chain length of C6 and longer, wherein the polymer composition comprising the first optical layer has a Tg below 30° C. and the polymer is birefringent; and (2) a plurality of second optical layers disposed in a repeating sequence with the plurality of first optical layers, each second optical layer comprising low refractive index polymers, such as olefins, urethanes and siloxanes, alkyl acrylates and polyethers having a Tg below room temperature. Generally, the refractive index for the first optical layer exhibits a strain induced birefringence of >0.05, when oriented and the second optical layer exhibits a birefringence of <0.05, when oriented under the same conditions as the first optical layer.

In another aspect, the present invention provides an improved polymeric composition for use as the first optical layer. This copolyhexamethylene terephthalate, also called CoPHT, comprises the repeatable polymerizable units of:

50–100 mol % terephthalate subunits and 0–50 mol % isophthalate, naphthalate, adipate, sebacate, or cyclohexanate as dicarboxylate comonomer subunits, and 50–100 mol % 1,6 hexane diol, 0–50 mol % longer chain diols, 0–50 mol % triethylene glycol, 0–50 mol % polyethylene glycol, 0–20 mol % ethylene glycol, 0–20 mol % neopentyl glycol, 0–20 mol % 2-butyl 2-ethyl 1,3 propanediol, and 0.01–10 mol % branching comonomers such as trimethylol propane or 0.01–10 mol % pentaerythritol as glycol comonomer subunits; preferably 80–100 mol % terephthalate subunits and 0–20 mol % isophthalate, naphthalate, adipate, sebacate, or cyclohexanate as dicarboxylate comonomer subunits, and 80–100 mol % 1,6 hexane diol, 0–20 mol % longer chain diols, 0–20 mol % triethylene glycol, 0–20 mol % polyethylene glycol, 0–20 mol % ethylene glycol, 0–20 mol % neopentyl glycol, 0–20 mol % 2-butyl 2-ethyl 1,3 propanediol, and 0.01–10 mol % branching comonomers such as trimethylol propane as glycol comonomer subunits; more preferably 90–100 mol % terephthalate subunits and 0–10 mol % sebacate as dicarboxylate comonomer subunits, and 90–100 mol % 1,6 hexane diol and 0–10 mol % triethylene glycol, 0–10 mol % ethylene glycol, 0–10 mol % 2-butyl 2-ethyl 1,3 propanediol, and 0.01–10 mol % branching comonomers such as trimethylol propane as glycol comonomer subunits.

Another embodiment of low Tg birefringent copolyesters comprises naphthalate as the major carboxylate subunit. These low Tg copolyesters would require either aliphatic carboxylate comonomer subunits and/or aliphatic diol comonomers that are C7 and longer to suppress the Tg below 30° C. This naphthalate based copolyester comprises the repeatable polymerizable units of:

50–100 mol % naphthalate subunits and 0–50 mol % adipate, azelate, sebacate, or longer chain dicarboxylate comonomers, and 0–100 mol % 1,6 hexane diol, 0–100 mol % C7 and longer chain diols, 0–20 mol % TEG, 0–20 mol % neopentyl glycol, 0–20 mol % 2-butyl-2-ethyl 1,3-propanediol, and 0.01–10 mol % branching comonomers such as trimethylol propane as glycol comonomer subunits.

A particularly useful aspect of the present invention is an optical film comprising a first optical layer comprised of coPHT and a second optical layer comprised of a low refractive index polyolefin, having a Tg of less than 30° C.

Polymer

Polymers useful for the first optical layers of this invention are unique in that they exhibit birefringent properties and elastomeric-like properties. These birefringent polymers exhibit these elastomeric-like properties because they are semi-crystalline and have a low enough Tg, such that the amorphous portion of the polymer is not glassy at room temperature. When processed appropriately, these polymers contain small crystals networked within a non-glassy amorphous bulk which enables them to recover from elastic deformation. More preferred polymers of this invention are polyesters that contain aromatic carboxylate comonomer subunits that align sufficiently when oriented to create significant birefringence (>0.05). Carboxylate comonomer subunits known to provide exceptional birefringence are 1,4 dimethylterephthalate and 2,6 dimethylnaphthalene dicarboxylate. In addition, these more preferred polymers contain long chain diols (C6 and greater) to suppress the glass transition temperature below 30° C. Polyether glycols, such as DEG (diethylene glycol), TEG (triethylene glycol), and PEG (polyethylene glycol) are also useful for suppressing the glass transition temperature of these polyesters. Specific examples of the polymers of the present invention are set forth in Tables 1 and 2, following.

PHT (polyhexamethylene terephthalate) has a high enough crystallization rate that cast webs of sufficient thickness for use as multi-layer optical films will become highly crystalline when manufactured on conventional film processing equipment. This high degree of crystallinity can cause non-uniformity of the cast web, and difficult processing during the film orientation steps.

Novel combinations of comonomers for melt processable thermoplastics have been investigated which control the rate of crystallinity for improved processability and flexibility of the film. Particularly useful comonomers for suppressing crystallization rates in coPHT (copolyhexamethylene terephthalate) have been found to be glycol ethers such as TEG (triethylene glycol) and aliphatic branched diols such as NPG (neopentyl glycol) and BEPD (2-butyl 2-ethyl 1,3 propanediol).

Branched multi-functional comonomers, such as TMP (trimethylolpropane) and pentaerythritol have been found useful to control rheology for matching the theological properties of the high and low refractive index materials. Multifunctional comonomers also increase the elasticity of the polymer.

Generally, polymers used to make oriented films need a minimum molecular weight to achieve sufficient polymer entanglement to prevent film breakage upon orientation. Low molecular weight and thus insufficient polymer entanglement may also limit the level of birefringence that can be achieved. Typically, these polymers have a high enough molecular weight to provide an Intrinsic Viscosity of 0.4 dl/g as measured per ASTM D4603-91 using a 60/40 mixture of phenol/o-dichlorobenzene as the solvent at 30 C. Preferably, these polymers have an intrinsic viscosity of at least 0.5 dl/g to improve birefringence. The polymers are generally comprised of repeatable units of terephthalate, dicarboxylate comonomer subunits, and glycol comonomer subunits. Particularly useful dicarboxylate comonomers include but are not limited to isophthalate, naphthalate, adipate, sebacate, or cyclohexanate and particularly useful glycol monomers include, but are not limited to 1,6 hexane diol, longer chain diols (>C6), triethylene glycol, polyethylene glycol, neopentyl glycol, 2-butyl 2-ethyl 1,3-propanediol, trimethylol propane or pentaerythritol. The amounts of the various components range from 50–100 mol % of terephthalate monomer, from 0–50 mol % of a dicarboxylate monomer or mixture of dicarboxylate monomers and from 0–50 mol % of a glycol comonomer or mixtures of glycol comonomers. The amount of each component is added in the most effective amounts and are dependent on the nature of the component. For example some glycols are only added in amounts of no more than approximately 5 mol %.

Effective amounts of the various components include but are not limited to the following ranges: 50–100 mol % terephthalate subunits and 0–50 mol % isophthalate, naphthalate, adipate, sebacate, or cyclohexanate as dicarboxylate comonomer subunits, and 50–100 mol % 1,6 hexane diol, 0–50 mol % longer chain diols (>C6), 0–50 mol % triethylene glycol, 0–50 mol % polyethylene glycol, 0–20 mol % ethylene glycol, 0–20 mol % neopentyl glycol, 0–20 mol % 2-butyl 2-ethyl 1,3 propanediol, and 0.01–10 mol % branching comonomers such as trimethylol propane or 0.01–10 mol % pentaerythritol as glycol comonomer subunits; preferably 80–100 mol % terephthalate subunits and 0–20 mol % isophthalate, naphthalate, adipate, sebacate, or cyclohexanate as dicarboxylate comonomer subunits, and 80–100 mol % 1,6 hexane diol, 0–20 mol % longer chain diols (>C6), 0–20 mol % ethylene glycol, 0–20 mol % triethylene glycol, 0–20 mol % polyethylene glycol, 0–20 mol % neopentyl glycol, 0–20 mol % 2-butyl 2-ethyl 1,3 propanediol, and 0.01–10 mol % trimethylol propane as glycol comonomer subunits; more preferably 90–100 mol % terephthalate subunits and 0–10 mol % sebacate as dicarboxylate comonomer subunits, and 90–100 mol % 1,6 hexane diol and 0–10 mol % triethylene glycol, 0–10 mol % 2-butyl 2 -ethyl 1,3 propanediol, and 0.01–10 mol % trimethylol propane as glycol comonomer subunits.

PHN (polyhexamethylene naphthalate) has a glass transition temperature of 56° C. and thus it must be copolymerized with longer chain aliphatic carboxylate comonomers and/or longer chain aliphatic diols to suppress the Tg below 30° C. In addition, copolyesters of naphthalate and strictly aliphatic comonomers have very high crystallization rates. This high degree of crystallinity can cause non-uniformity of the cast web, and difficult processing during the film orientation steps. Thus comonomers for suppressing crystallization rates in copolyesters of naphthalate should be incorporated such as TEG (triethylene glycol) and aliphatic branched diols such as NPG (neopentyl glycol) and BEPD (2-butyl 2-ethyl 1,3 propanediol). Branched multi-functional comonomers, such as TMP (trimethylolpropane) and pentaerythritol would also be useful for controlling the rheology of the naphthalate copolyester for rheology matching with the low refractive index (second optical layer) polymers.

Multilayer Optical Films

Figure 9:
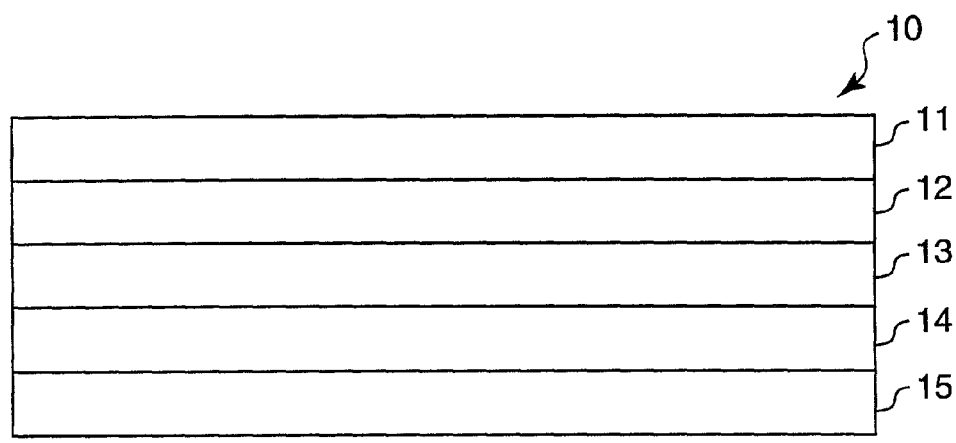
FIG. 9 is an end view of a film configuration according to present invention.

Referring to FIG. 9, multilayered optical films 10 include one or more first optical layers 11, 14, one or more second optical layers 12, 15, and optionally, one or more non-optical layers 13 (although one is shown). Non-optical layers can also be disposed on a surface of the multilayer optical film as a skin layer (not shown) or disposed between optical layers (as shown). The first 11, 14 and second optical layers 12, 15 and, optionally, the non-optical layers 13, if any, are coextruded and oriented by, for example, stretching. Orientation typically significantly enhances the optical power (e.g., reflectivity) of the multilayer optical films due to birefringence of the first or second optical layers or both.

The optical layers are typically interleaved to form a stack of layers 10, optionally, with one or more of the non-optical layers included within 13 or as a skin layer of the stack 10. Typically, the optical layers are arranged as alternating pairs, to form a series of interfaces between layers with different optical properties. The optical layers are typically no more than 1 μm thick and can have a thickness of 400 nm or less.

The optical layers can have the same thicknesses. Alternatively, the multilayer optical film can include layers with different thicknesses to increase the reflective wavelength range.

Although FIG. 9 shows only four optical layers multilayer optical films 10 can have a large number of optical layers. Examples of suitable multilayer optical films include those having about 2 to 5000 optical layers. Generally, multilayer optical films have about 25 to 2000 optical layers and typically about 50 to 1500 optical layers or about 75 to 1000 optical layers. It will be appreciated that multilayer optical films can consist of a single stack or can be made from multiple stacks that are subsequently combined to form the optical film 10. Two stacks have been combined to form optical film 10.

Additional sets of optical layers, similar to the first and second optical layers can also be used in the multilayer optical film 10. The design principles disclosed herein for the sets of first and second optical layers can be applied to any additional sets of optical layers. In addition, different repeating patterns of optical layers can be used (e.g., "ABCBA . . . ", where A, B, and C are optical layers with different compositions). Some such patterns are set forth in U.S. Pat. No. 5,360,659, which is incorporated herein by reference.

The transmission and reflection characteristics of the multilayer optical films are based on coherent interference of light caused by the refractive index difference between the first and second optical layers and the thicknesses of the first and second optical layers. When the in-plane indices of refraction differ between the first and second optical layers, the interface between adjacent first and second optical layers forms a reflecting surface. The reflective power of the interface depends on the square of the difference between the in-plane indices of refraction of the first and second optical layers (e.g., $(n_{10}-n_{20})^2$, where $n_{10}$ is an in-plane refractive index of the first optical layers and $n_{20}$ is an in-plane refractive index of the second optical layers).

The multilayered optical films can be configured to include polarizers, mirrors (reflected light), clear to colored films, colored to colored films, color mirrors and the like.

The first optical layers are made using birefringent polymers that are uniaxially- or, preferably, biaxially-oriented to increase the in-plane refractive index (or indices) of the first optical layers, thereby increasing the difference between the refractive indices of the first and second layers. In some embodiments, the second optical layers are polymer layers that are birefringent and either increase the in-plane refractive index (or indices) only slightly or preferably decrease the in-plane refractive index (or indices) when uniaxially- or biaxially-oriented. In other embodiments, the second optical layers are polymer layers having an isotropic index of refraction (e.g., substantially the same index of refraction in all directions) that is typically different from one or both of the in-plane indices of refraction of the first optical layers 11, 14. Although, the present invention will be exemplified using optical films 10 with second optical layers 12, 15 that have an isotropic index of refraction, the principles and examples described herein can be applied to multilayer optical films with second optical layers 12, 15 that are birefringent.

The first optical layers can be made birefringent by, for example, stretching the first optical layers in a desired direction or directions. For example, the first optical layers can be biaxially-oriented by stretching in two different directions. The stretching of optical layers in the two directions can result in a net symmetrical or asymmetrical stretch in the two chosen orthogonal axes. Symmetrical stretching in two directions can yield in-plane refractive indices that are substantially similar. As an alternative to stretching in two directions, the first optical layers can be uniaxially-oriented by, for example, stretching the layers in a single direction. A second orthogonal direction may be allowed to neck (e.g., decrease in length, width, or thickness) into some value less than its original dimension. The direction of stretching typically corresponds to one of the in-plane axes (e.g., the x or y axis) However, other directions can be chosen.

Typically, the highest reflectivity for a particular interface between first and second optical layers occurs at a wavelength corresponding to twice the combined optical thickness of the pair of optical layers. The optical thickness describes the difference in path length between light rays reflected from the lower and upper surfaces of the pair of optical layers. For light incident at 90 degrees to the plane of the optical film (normally incident light), the optical thickness of the two layers is $(n_1 d_2+n_2 d_2)$ where $n_1$, $n_2$ are the in-plane indices of refraction of the two layers and $d_1$, $d_2$ are the thicknesses of the corresponding layers. The equation $\lambda/2=(n_1 d_1+n_2 d_2)$ can be used to tune the optical layers for normally incident light. At other angles, the optical distance depends on the distance traveled through the layers (which is larger than the thickness of the layers) and the indices of refraction for at least two of the three optical axes of the layer. The optical layers can each be a quarter wavelength thick or the optical layers can have different optical thicknesses, as long as the sum of the optical thicknesses is half of a wavelength (or a multiple thereof). A multilayer optical film having more than two optical layers can include optical layers with different optical thicknesses to provide reflectivity over a range of wavelengths. For example, a multilayer optical film can include pairs or sets of layers that are individually tuned to achieve optimal reflection of normally incident light having particular wavelengths or may include a gradient of layer pair thicknesses to reflect light over a larger bandwidth.

These multilayer optical films can be designed to reflect one or both polarizations of light over at least one bandwidth. The layer thicknesses and indices of refraction of the optical stacks within the optical films can be controlled to reflect at least one polarization of specific wavelengths of light (at a particular angle of incidence) while being transparent over other wavelengths.

For example, the multilayer optical films can be designed to reflect light over substantially all of the visible light region (about 400 to 750 nm) to form a visible mirror. The visible mirror may be a cold mirror, reflecting only the visible wavelengths of light and transmitting the IR, or it may be a broadband mirror that reflects both the visible and IR wavelengths. Visible mirrors are described, for example, in U.S. Pat. No. 5,882,774 and WO 97/01774, and a cold mirror is described, for example, in U.S. Pat. No. 5,339,198 and U.S. Pat. No. 5,552,927, all of which are incorporated herein by reference. For cold mirrors, the typical optical layer thickness is in the range of 100 to 200 nm. For visible/IR mirrors, the typical optical layer thickness is in the range of 100 to 600 nm (for a ¼ wavelength design).

Multilayer optical film can also reflect light over only a portion of the visible range. These optical films can be used as color shifting films, because as viewing angle changes, the wavelength region of reflection also changes. Further description of color changing films, principles of operation, and examples of film configurations are presented in WO 99/36257 and WO 99/36258, both of which are incorporated herein by reference. These optical films can be tailored to exhibit a sharp band edge at one or both sides of at least one reflective bandwidth, thereby giving a high degree of color saturation at acute angles, if desired, as described in WO 99/36809, incorporated herein by reference.

First Optical Layers

Preferred properties of the material used for the first optical layers include: (1) strained induced birefringence, (2) thermal stability, (3) processing temperatures compatible with the materials of the second optical layers, (4) UV stable or protectable, (5) high clarity (e.g., high transmission and low absorption over wavelengths of interest), (6) Tg below room temperature, (7) viscosities that facilitate viscosity matching with the materials of the second optical layers, to ensure co-extrusion and flow stability, (8) good interlayer adhesion with the second optical layers, (9) low optical dispersion, (10) good z-index matching with the second optical layers, and (11) drawability (e.g., the ability to be oriented). Other factors include cost and commercial availability.

The first optical layer polymers as well as the other polymers listed above, can be made birefringent by, for example, stretching the first optical layers 12 in a desired direction or directions. Orientation is typically accomplished at a temperature above the glass transition temperature and below the melting temperature of the polymer. Some polymers with low crystallinity can be oriented at or below the glass transition temperature as described in, for example, co-pending U.S. Pat. No. 6,268,961, incorporated herein by reference.

The amount of birefringence and the amount of change in refractive index obtained for these polymers depends on a variety of factors including, for example, the draw ratio, the orientation temperature, heat annealing and whether the polymer is uniaxially or biaxially oriented. Typically, the larger the draw ratio, the larger the change in refractive index. However, the achievable draw ratio can be limited by the orientation temperature. Furthermore, heat annealing of the oriented film can further enhance birefringence.

For many birefringent materials, the orientation is best done slightly above the glass transition temperature. If the temperature is too cold, the achievable draw ratio may be too low because the polymer exhibits excessive strain hardening when drawn and can crack or form microvoids. However, in general, the closer that the orientation temperature is to the glass transition temperature, the larger the change in refractive index for a given draw ratio. Thus, drawing the polymer at a temperature that is substantially above (e.g., 20° C. or 30° C.) the glass transition temperature of the polymer will typically result in significantly less change in the refractive index for a given draw ratio.

For some of the preferred first polymers of this invention, orientation may be done significantly above the glass transition temperature (as much as 100–140° C.), closer in fact to the melting temperature and still achieve significant degrees of birefringence.

For these polymers, some initial crystallinity that occurs upon cooling following extrusion allows the polymer to be handled at higher temperatures without the precipitous drop in modulus that occurs for totally amorphous polymers. This network of polymer chains connected by crystalline regions is best oriented near the melting point of the polymer, where chain mobility is highest and crystalline regions may be broken and reformed during the drawing operation. In this aspect, the novel birefringent preferred polymers of this invention are similar to polypropylene and other polyolefins, that may be stretched 10–25° C. below their melting temperatures.

Material selection can influence the optical and physical properties of the multilayer optical film. Polyesters, like PHN (polyhexamethylenenaphthalate), PHT (polyhexamethyleneterephthalate) and PET (polyethyleneterephthalate), include carboxylate and glycol subunits and can be generated by, for example, (a) reaction of carboxylate monomers with glycol monomers or (b) transesterification. Each carboxylate monomer has two or more carboxylic acid or ester functional groups and each glycol monomer has two or more hydroxy functional groups. Polyesters can be formed using a single type of carboxylate monomer or two or more different types of carboxylate monomers. The same applies to the glycol monomers. Also included within the term "polyester" are polycarbonates which are derived from the reaction of glycol monomers with esters of carbonic acid.

The properties of a polymer layer or film vary with the particular choice of monomers. PHN includes carboxylate subunits formed from 2,6-naphthalene dicarboxylic acid or esters thereof and PHT includes carboxylate subunits formed from terephthalic acid or esters thereof. Suitable carboxylate comonomers for forming the carboxylate subunits of copolyesters of PHN and PHT include, for example, 2,6-naphthalene dicarboxylic acid and isomers thereof; terephthalic acid; isophthalic acid; phthalic acid; azelaic acid; adipic acid; sebacic acid; norbornane dicarboxylic acid; bi-cyclooctane dicarboxylic acid; 1,6-cyclohexane dicarboxylic acid and isomers thereof; t-butyl isophthalic acid; tri-mellitic acid; sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1–C10 straight-chained or branched alkyl groups.

Both PHN and PHT include glycol subunits formed using 1,6 hexanediol. Suitable glycol comonomers for forming glycol subunits of copolyesters of PHN and PHT include ethylene glycol, propylene glycol; 1,4-butanediol and isomers thereof; neopentyl glycol; polyethylene glycol; diethylene glycol; triethylene glycol, 2-butyl 2-ethyl 1,3 propanediol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

Suitable multilayer optical films can be formed in a variety of configurations. Particularly useful PHT-based materials include PHT, coPHT polymers or blends that have a glass transition temperature of no more than about 30° C., or of no more than about 25° C. or 20° C. Typically, the most useful of these PHT-based materials are copolyhexamethyleneterephthalates containing crystallization rate suppressing comonomers. In such constructions, the material for the second optical layers generally will also include a material having glass transition temperature of no more than about 30° C.

Other copolymers of PHT can also be used, including those incorporating (i) carboxylate monomer materials, such as, for example, isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid; tri-mellitic acid; sodium sulfonated isophthalic acid; 2,2'-biphenyl dicarboxylic acid and isomers thereof; and lower alkyl esters of these acids, such as methyl or ethyl esters; and (ii) glycol monomer materials, such as, for example, propylene glycol; 1,4-butanediol and isomers thereof; 1,6-hexanediol; neopentyl glycol; polyethylene glycol; diethylene glycol; triethylene glycol; 2-butyl 2-ethyl 1,3 propanediol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy) benzene.

Alternatively, the first optical layers can be formed using a polymer or blend of PHT with other copolyesters that have Tg's less than 30° C. In such constructions, the resulting blended material will have a bulk Tg of less than 30° C.

The similarity in physical properties of the described copolyesters to polypropylenes and copolypropylenes has enabled them to be coextruded and oriented at polypropylene process conditions. Surprisingly, it has been found that coextruded polypropylene skins enable the coPHT's to be oriented to higher draw ratios. Without polypropylene skins, the maximum biaxial orientation draw ratio found for coPHT is generally in the range of 3.4×3.4. Coextrusion of polypropylene skins with coPHT multilayer constructions has enabled biaxial orientation draw ratios up to 5.5×5.5. Capability to orient these low Tg multilayer optical films broadens their processing window considerably and allows them to be manufactured on a variety of existing film manufacturing lines. Utilizing polypropylene skins in MOF constructions offers many advantages including; flexibility, crease recovery, printability with existing inks, solvent resistance, and low cost.

Second Optical Layers

Preferred properties of the second optical layers include, for example, (1) isotropic or negative birefringence, (2) thermal stability, (3) processing temperatures compatible with the materials of the first optical layers, (4) UV stable or protectable, (5) high clarity (e.g., high transmission and low absorption over wavelengths of interest), (6) Tg below room temperature, (7) viscosities that facilitate viscosity matching with the materials of the first optical layers, to ensure co-extrusion and flow stability, (8) good interlayer adhesion with the first optical layers, (9) low optical dispersion, (10) good z-index matching with the first optical layers, and (11) drawability (e.g., the ability to be oriented without birefringence). Other factors include cost and commercial availability.

In some embodiments, the second optical layers 12, 15 are made of a polymer material that does not appreciably optically orient when stretched under conditions that are used to orient the first optical layers 11, 14. Such layers are particularly useful in the formation of reflective optical films, because they allow the formation of a stack 10 of layers by, for example, coextrusion, which can then be stretched to orient the first optical layers 11, 14 while the second optical layers 12, 15 remain relatively isotropic (e.g., an in-plane birefringence of 0.05 or less). In other embodiments, the second optical layers 12, 15 are orientable and are, preferably, negatively birefringent (when the first optical layers are positively birefringent) so that the in-plane refractive indices decrease with orientation.

There are a variety of considerations in the selection of the materials for the first and second optical layers. The importance of these considerations typically depends on the desired optical properties and uses for the optical films. One consideration is the glass transition temperature of the second optical layers. Typically, the materials of the first and second optical layers are selected so that the glass transition temperature of the second optical layers is not substantially higher than the glass transition temperature of the first optical layers. More preferably, the glass transition temperature of the second optical layers is equal to or less than the glass transition temperature of the first optical layers. If the glass transition temperature of the second optical layers is too high, orientation of the first optical layers at a suitable orientation temperature near the glass transition temperature of the first optical layers can cause excessive strain hardening in the second optical layers. This can diminish the optical quality of the second optical layers by, for example, introducing cracks or microvoids. However, with many of the preferred polymers of the first optical layers of this invention, orientation that produces birefringence may occur well above the glass transition temperature of the first optical layer. This allows these polymers of the first optical layer to be combined with polymers of the second optical layer that have glass transition temperatures above the Tg of the polymer of the first optical layer. The glass transition temperature of an optical layer is defined as the glass transition temperature of the composition that is used to form the optical layer and not the glass transition temperature(s) of the individual components.

Another consideration is the difference in the z-axis refractive indices between the first and second optical layers. When the z-axis refractive indices of the two layers are equal, the reflectance of p-polarized light does not depend on the incident angle of light. This feature can be useful when reflectance uniformity over a range of viewing angles is desired. In such embodiments, the difference in z-axis refractive indices between the first and second optical layers is preferably no more than about 0.04 and, by selection of materials can be made no more than about 0.02 or no more than about 0.01. See for example, U.S. Pat. No. 6,045,894 that is herein incorporated by reference.

Another consideration is the decomposition temperature of the polymer(s) selected for use in the second optical layers. Typical coextrusion processing temperatures for PHN and PHT are above about 200° C. Degradation of the components of the second optical layers can produce defects in the optical film, such as, for example, discoloration and regions of gel formation. Materials that do decompose at the processing temperatures can still be used if the decomposition does not result in unacceptable properties.

The second optical layers 12 can be made using a variety of polymeric compositions. The description of suitable polymers with respect to particular optical film configurations is provided below.

Among the materials for suitable second optical layers are low Tg polyacrylates, fluorinated polymers and their copolymers and aliphatic polyolefins, including blends of these polymers with other materials and polymers. For example, PVDF could be blended with a low Tg CoPMMA for reduced refractive indices.

The low refractive index (low RI) materials preferably have a refractive index that is at least 0.05 units smaller than the highest of the indices of the birefringent, high refractive index layers. These materials should have a melt viscosity shear rate match to the high refractive index, birefringent polymer that is within a factor of five. Additionally, the components comprising this layer need to be thermally stable at the processing temperatures of the high refractive index layer. The material(s) of the low refractive index layers must be capable stretching in the plane of the film at the orientation stretch ratios, temperatures and rates suitable for the high refractive index layer. Finally, after the orientation, the interlayer adhesion between the high refractive index and low refractive index layers must be adequate for the desired end use.

Another consideration is good flow stability between the first and second optical polymers. This requires a good viscosity match between the first and the second optical layers. If there is a mismatch in the melt viscosity of the first and second optical layers such that the viscosity of the second optical layer is higher than the first optical layer, then minor amounts (<50%, typically <25%) of a rheology modifier can be blended into the second optical layer to lower the viscosity to closely match the viscosity of the first optical layer. Viscosity ratios of the first and the second optical layers preferably differ by no more than a factor of 5. For example, the rheology modifier would be melt processable at the conditions of the second optical layer and form a miscible blend with the second optical layers. The rheology modifier, for example could be a plasticizer, a tackifier or a low molecular weight polymer. The rheology modifier may also reduce the elasticity of the second polymer, making it more Newtonian, to better match the Theological characteristics of the first polymer.

It is contemplated that aliphatic polyolefins can be used. Examples of suitable polyolefins include poly(ethylene-co-octene) (PE-PO), poly(propylene-co-ethylene) (PP-PE), a polymer of atactic and isotactic polypropylene (aPP-iPP), maleic anhydride functionalized linear low density polyethylene (LLDPE-g-MA), and poly(ethylene-co-vinyl acetate) (EVA). Other useful polyolefins include acid-modified polyolefins such as "Bynel" polyolefins from E. I. duPont de Nemours & Co., Inc. (Wilmington, Del.), "Primacor" polyolefins from Dow Chemical Co. (Midland, Mich.), and "Admer" polyolefins from Mitsui Petrochemical Industries, Ltd. (Tokyo, Japan). In addition, the use of elastomeric polyolefins can enhance mechanical properties of the multilayer optical films, including, for example, crease and crumple recovery, folding endurance, tear resistance, puncture resistance, and toughness.

Most polyolefins that are modified with functional groups for improved adhesion are not thermally stable enough for coextrusion with PET at 260° C. without degradation and gel formation. The low melting point of the high refractive copolyesters allows for lower melt processing temperatures, but the long residence times of multilayer feedblocks still tends to cause gel formation in modified olefins. Certain modified polyolefins such as Admer have been found to be more thermally stable than other modified polyolefins. The elastic nature of these polyolefins also provide unique crease recovery properties not found in other low refractive index materials. It is contemplated that an elastic polyolefin such as a polymer of octene and ethylene may have a sufficiently low modulus that it provides adequate interlayer adhesion even without the addition of any polar groups.

Additional low index materials investigated are thermoplastics based on polydimethyl siloxane including silicone pressure sensitive adhesives (PSA) from Dow Corning and polyurea silicones from 3M. The low Tg and very low refractive index of these materials will improve the optical power of multilayer films with CoPHT as high refractive index layers, and will enable multilayer optical films to be constructed with polypropylene as high refractive index layers.

It is further contemplated that aliphatic polyurethanes would be quite useful in the practice of this invention, since these resins have excellent transparency, are non-yellowing, and elastic recovery properties are excellent. Morthane PE299-100, available from Huntsman Polyurethanes is expected to have a good viscosity match to the preferred copolyesters of this invention.

Non-Optical Layers

Referring again to FIG. 9, one or more of the non-optical layers can be formed as a skin layer or skin layers (not shown) over at least one surface of stack 10 as illustrated in FIG. 9, to, for example, protect the optical layers from physical damage during processing and/or afterwards. In addition or alternatively, one or more of the non-optical layers can be formed within the stack 10 of layers, as illustrated in FIG. 9, to, for example, provide greater mechanical strength to the stack or to protect the stack during processing.

The non-optical layers ideally do not significantly participate in the determination of optical properties of the multilayer optical film 10, at least across the wavelength region of interest (e.g., visible, IR or UV wavelength regions). The non-optical layers 13 may or may not be birefringent or orientable. Typically, when the non-optical layers 13 are used as skin layers there will be at least some surface reflection. In at least some applications where high transmission of light is desired, the non-optical layers preferably have an index of refraction that is relatively low (e.g., no more than 1.6 or, preferably, no more than 1.5) to decrease the amount of surface reflection (e.g., iridescence). In other applications where reflectivity of light is desired, the non-optical layers preferably have a relatively high refractive index (e.g., at least 1.6, more preferably at least 1.7) to increase reflectance of the multilayer optical film.

When the non-optical layers are found within the stack 10, there will typically be at least some polarization or reflection of light by the non-optical layers in combination with the optical layers adjacent to the non-optical layers. In at least some instances, however, the non-optical layers can be selected to have a thickness that dictates that light reflected by the non-optical layers within the stack 10 has a wavelength outside the region of interest, for example, in the infrared region for optical films that reflect visible light. The thickness of the non-optical layers can be at least two times, typically at least four times, and, in many instances, at least ten times, the thickness of one of the individual optical layers. The thickness of the non-optical layers can be varied to make an optical film having a particular thickness. Typically, one or more of the non-optical layers are placed so that at least a portion of the light to be transmitted, polarized, and/or reflected by the optical layers also travels through the non-optical layers (i.e., the non-optical layers are placed in the path of light which travels through or is reflected by the optical layers).

Opaque fillers such as carbon black or $TiO_2$ may be incorporated into the non-optical layers to provide unique changes in color especially when the optical layers are embossed such that the wavelengths of reflected light change. The embossing could also thin the optical layers sufficiently that no visible light is reflected which would then allow the black or white opaque layer to show through. This technique would be useful for eliminating the need for inks in displaying letters, numbers, and symbols.

The non-optical layers are formed from polymers including any of the polymers used in the first and second optical layers. In some embodiments, the material selected for the non-optical layers is similar to or the same as the material selected for the second optical layers. Materials may be chosen for the non-optical layers that impart or improve properties such as, for example, tear resistance, puncture resistance, toughness, weatherability, and solvent resistance of the multilayer optical film.

Olefin copolymers used as non-optical skin layers have been found to improve multi-layer optical film properties such as crumple recovery. The copolymer used in the skin layers includes copolymers of propylene and ethylene or alpha-olefin materials having between 4 to 10 carbon atoms, such that the propylene content of the copolymer is greater than 90% by weight. Ethylene-propylene copolymers having ethylene content of 4 to 7% by weight are particularly preferred. The term "copolymer" includes not only the copolymer, but also terpolymer and polymers of four or more component polymers. Preferably, the copolymer is a random copolymer.

The skin layer resin may also include additives and other components as is known in the art such as antioxidants, stabilizers, neutralizers, plasticizers, colorants, lubricants, processing aids, nucleating agents, ultraviolet light stabilizing agents, antistatics, and other property modifiers in an amount effective for each case.

One suitable skin layer resin is an ethylene-propylene random copolymer resin having a melt flow index of 11 g/10 minutes and a melting point of 134° C., commercially available under the product designation 8650 from Atofina Petrochemicals, Inc., Houston, Tex.

Other Layers and Coatings

Various functional layers or coatings can be added to the multilayer optical films of the present invention to alter or improve their physical or chemical properties, particularly along the surface of the multilayer optical film. Such layers or coatings are described in US 01-0008700-A1 and pending application Ser. No. 09/835,954, herein incorporated by reference. Such layers or coatings may include, for example, slip agents, low adhesion backside materials, conductive layers, antistatic coatings or films, barrier layers, flame retardants, UV stabilizers, abrasion resistant materials, optical coatings, and/or substrates designed to improve the mechanical integrity or strength of the film or device, as described in WO 97/01440, which is herein incorporated by reference. Dichroic polarizing films can also be coated on or co-extruded with the multilayer optical films, as described, for example, in WO 95/17691, WO 99/36813, and WO 99/36814, all of which are herein incorporated by reference.

Security Features

A number of security features have been developed to authenticate documents of value, thus preventing forgers from producing a document, which resembles the authentic document during casual observation, but lacks the overt or covert security features known to be present in the authentic document. Overt security features include holograms and other diffractive optically variable images, embossed images, and color-shifting films, while covert security features include images only visible under certain conditions such as inspection under light of a certain wavelength, polarized light, or retroreflected light. Even more sophisticated systems require specialized electronic equipment to inspect the document and verify its authenticity.

The optical films of this invention provide a visual security feature, with color shifting mirrors and polarizers. Embossing to thin the optical layers and shift the reflection band(s) to a lower wavelength has been described in U.S. Pat. No. 6,045,894 (Clear to Colored Security Film) and is incorporated herein by reference. A further improvement on what is taught in that application that is contemplated here is to put two multilayer optical films together with black, white and transparent regions. This could be accomplished by printing and lamination. The white regions will have the complementary color shift from the black regions.

For example, if the film reflects green and very near infrared light, the color shift in transmission will be magenta to green. Where there is a white region, the color of the film will be magenta at normal incidence and green at >60 degrees. In the black regions, transmitted light is absorbed, so the reflected color will be evident. In this example, green at normal incidence will shift to magenta at >60 degrees. For the embossed regions, the layers are thinned down so that the color that would be shifted to as the angle of incidence changes appears at normal incidence. In the example above, the embossed regions at normal incidence in transmission are green against the magenta background. As the angle of incidence moves away from normal incidence to >60 degrees, the embossed regions shift back to magenta, while the film in transmission turns green. The opposite color shift occurs for the regions with the black layer.

For the regions without a black or white layer, the user will be able to see through the film. By tilting the film, the transmitted color shift will also be apparent. This combination of white, black and transparent regions provide numerous opportunities for overt verification.

In addition, the common practice in polymer banknotes of overprinting the film with a white opacifying coating and using security printing inks is anticipated. The placement of the transparent region(s) is a security feature. Some of these transparent regions, or windows, may lack opacifying coatings on both sides, for viewing the color shift in transmitted light. Other windows may have no coating on one side, and a white or black coating on the opposite side. The white coating would provide a diffuse reflector behind the color shifting film. A black coating would eliminate the transmitted light, providing the complementary color shift of the transparent or diffuse white coated film. The black or white coatings allow the color shift to be viewed without a high degree of scrutiny when someone receives the banknote.

Other security features may also be practiced, such as: hot stamping of holograms (transparent or aluminum vapor coated), printing with color shifting and/or magnetic inks, and laser ablation to produce small holes that become apparent when held to a strong backlight.

In the case of the color-shifting inks, unique combinations of color shifting inks and color shifting films are anticipated to have interesting optical effects. For example, the green to black ink used on US currency might be used to print the denomination in the transparent window region of the magenta to green film. At normal incidence, from the printed side, one would observe green colored regions against a magenta background if placed over a white background. As the film is tilted, the printed denomination turns black while the film turns green. When the banknote is turned over and viewed from the opposite side, the green light is already being reflected, so the denomination will appear dark against the magenta color of the film. Upon tilting, the black denomination will be visible against the green transmission color of the film. If however, the film is held up to a light, the reflection of the color shifting ink will not be easy to discern and the denomination will appear black while the transparent, color shift of magenta to green is observed around the printing. If instead, the transparent window is placed over a black object (or if a region of the film has a black layer behind it), the green color-shifting ink will match the green reflection of the film. Upon tilting the black color-shifting ink will become readily visible against the magenta reflection of the film.

If instead, a film is made with two reflectance bands situated in the red and blue regions, the film will appear green against a white background at normal incidence, and shift to magenta at >60 degrees. If the green to black ink is used as described above, in this case from the front side, the green denomination will blend in with the green transmitted light when viewed from the front. Upon tilting, the film will turn to magenta, while the denomination shifts to black. From the back, the green reflected light of the printed denomination will also have low contrast with the green transmitted color of the film. Upon tilting, the black denomination will stand out against the magenta background.

When held up to a strong light and viewed from either side, the reflected colors of the ink will be difficult to see and the denomination will appear dark or black against a green background at normal incidence, shifting to a magenta background at >60 degrees.

A further concept is to employ a green to magenta transmitted light color shift for one denomination and use magenta to green in the higher denominations. If the transparent regions of two banknotes are aligned over a white background, a silver appearance will be formed due to the reflection of all visible wavelengths. This would remain silver over the range of angles from 0 to 60 degrees. Further, when held to a strong backlight, little or no light would get through the matched transparent regions at 0–60 degrees. At extremely shallow viewing angles approaching grazing incidence, some red light would finally leak through.

Figure 10:
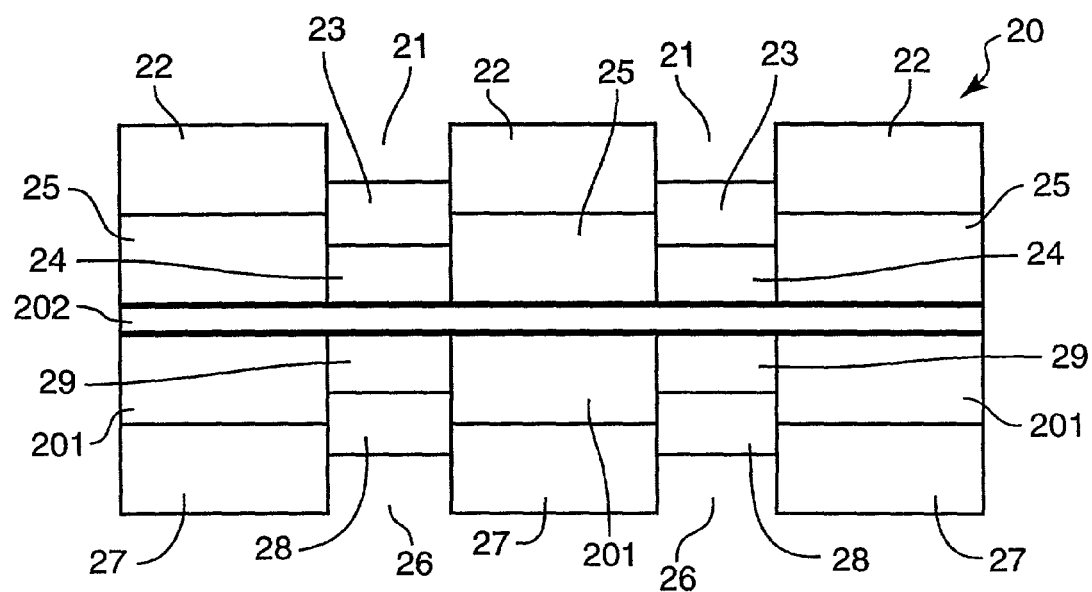
FIG. 10 is an end view of a film configuration according to present invention wherein portions were embossed.

Another contemplated feature of the films of this invention is a banknote composed of two different color shifting films embossed, then laminated together (FIG. 10). If the lamination can occur after printing the internal surface with white and black areas, numerous optical effects may be achieved. In this case, printing on the external surface of the film may not be required, and it is anticipated that this could greatly increase the longevity of the banknote in circulation.

Yet another unique feature of the films of the present invention that occurs when one or both of the polymers has a Tg near 25–30° C., is that stiffness changes of the note can be sensed in your fingers, because the 34–37° C. temperature of fingertips (under normal circumstances) warm the banknote from 20 or 25° C., thus causing a reduction in the stiffness of the banknote. It has been noticed that the sound the film makes in handling may also serve as a verifiable feature. In the above example, the sonic frequency (pitch in the musical sense) of the banknote would lower as it becomes warmed by handling.

If, instead, one or both glass transition temperatures are chosen to be between 0 and 15° C., the stiffness (and sonic frequency) changes in normal handling might not be noticed. But bank tellers, cashiers, and government officials could hear a higher pitched sound when the banknote is "snapped" after the note was run under cool water or placed in a refrigerator for a minute. The pitch of the sound would return to its lower frequency as it returned to room temperature. Counterfeit currency is by and large still identified by the sense of touch. Uniquely, the polynotes of the present invention get softer as the notes are handled.

For the case of the color shifting polarizer films of this invention, all of the above discussion applies when viewed with one plane of polarization. When viewed with the other polarization state, the film will be colorless. A polarizer window covering all the visible wavelengths could be used in one denomination to verify the color-shifting polarizers of the other denominations.

Another contemplated security feature is the addition of security fibers or pigments to the skin layers of the multi-layer optical film. As an alternative to using the films of this invention as the entire substrate for banknotes, these films could be slit into threads, or die cut or freeze-fractured into planchettes (fine flakes) and added to polymeric or paper substrates at the time of manufacturing.

Improved crumple and crease recovery properties of the present invention are such that the films of the present invention may be incorporated as security threads in paper or polymeric documents of value. Advantageously, films of the present invention provide security characteristics, such as color shifting and the like. Security threads could be printed with images or information, and could be from 0.5 to 10 mm in width. Additionally, information could be added to the security thread in a number of alternative forms, such as a narrow holographic image, a printed image, or a topographical feature, such as embossed numbers, characters or symbols. For example, these characters or symbols may have a color shift that is different from the surrounding, unembossed region of the color shifting film.

Alternatively, security threads may be made from polymeric multilayer optical films, wherein one or more of the polymers do not have glass transition temperatures below room temperature, provided that the film thickness is less than half of the document thickness, preferably less than ¼ of the document thickness. In this case, crumple and crease recovery properties may not be required, since the stiffness of the thread is considerably reduced by the reduction in thread thickness. It should be noted that chemical resistance may be required for the use of these security threads in some applications. In addition to the choices of polymers described hereinabove, the use of coatings, sealants or other additional layers with the desired chemical resistance may provide sufficient protection for the intended use.

As can be seen from the above description, there are numerous effects in transmitted and reflected light that can be used to verify the banknotes.

Manufacturing

A brief description of one method for forming multilayer optical films is provided. A fuller description of the process conditions and considerations is found in PCT Publications Nos. WO 99/36248, WO 99/06203, and WO 99/36812, all of which are incorporated herein by reference.

An initial step in the manufacture of the multilayer optical films is the generation of the polymers to be used in formation of the first and second optical layers, as well as the non-optical layers (unless the polymers are available commercially).

Typically, these polymers are melted and shaped by extrusion, although other methods of polymer plastication can be used. Extrusion conditions are chosen to adequately feed, melt, mix and pump the polymer resin feed streams in a continuous and stable manner. Final melt stream temperatures are chosen to be within a range that reduces freezing, crystallization, or unduly high pressure drops at the low end of the range and that reduces degradation at the high end of the range. The entire melt stream processing of more than one polymer, up to and including film casting on a chill roll, is often referred to as co-extrusion.

Preferably, the polymers of the first optical layers, the second optical layers, and the non-optical layers are chosen to have similar rheological properties (e.g., melt viscosities) so that they can be co-extruded. Typically, the second optical layers and the non-optical layers have a glass transition temperature, Tg, that is either below or no greater than about 30° C. above the glass transition temperature of the first optical layers. Preferably, the glass transition temperature of the second optical layers and the non-optical layers is below the glass transition temperature of the first optical layers. However, with many of the preferred polymers of the first optical layers of this invention, orientation that produces birefringence may occur well above the glass transition temperature of the first optical layer. This allows these polymers of the first optical layer to be combined with polymers of the second optical layer that have glass transition temperatures above the Tg of the polymer of the first optical layer.

Following extrusion, each melt stream is conveyed to a gear pump used to regulate the continuous and uniform rate of polymer flow. A static mixing unit can be used to carry the polymer melt stream from the gear pump into a multilayer feedblock with uniform melt stream temperature. The entire melt stream is typically heated as uniformly as possible to enhance both uniform flow of the melt stream and reduce degradation during melt processing.

Multilayer feedblocks divide each of the two or more polymer melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow can be controlled by choices made in machinery, as well as the shape and physical dimensions of the individual side channel tubes and layer slots.

The side channel tubes and layer slots of the two or more melt streams are often interleaved to form alternating layers. The feedblock's downstream-side manifold is typically shaped to compress and uniformly spread the layers of the combined multilayer stack transversely. Thick, non-optical layers, known as protective boundary layers (PBLs), can be fed near the manifold walls using the melt streams of the optical multilayer stack, or by a separate melt stream. As described above, these non-optical layers can be used to protect the thinner optical layers from the effects of wall stress and possible resulting flow instabilities.

The multilayer stack exiting the feedblock manifold enters a final shaping unit such as a die. Alternatively, the stream can be split, preferably normal to the layers in the stack, to form two or more multilayer streams that can be recombined by stacking. The stream can also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal streams widths (i.e., multiplier ratios greater than unity) can be useful in creating layer thickness gradients. In the case of unequal stream widths, the multiplier may spread the narrower stream and/or compress the wider stream transversely to the thickness and flow directions to ensure matching layer widths upon stacking.

Prior to multiplication, additional non-optical layers can be added to the multilayer stack. These non-optical layers may perform as PBLs within the multiplier. After multiplication and stacking, some of these layers can form internal boundary layers between optical layers, while others form skin layers.

After multiplication, the web is directed to a final shaping unit. The web is then cast onto a chill roll, sometimes also referred to as a casting wheel or casting drum. This casting is often assisted by electrostatic pinning, the details of which are well-known in the art of polymer film manufacture. The web can be cast to a uniform thickness across the web or a deliberate profiling of the web thickness can be induced using die lip controls.

The multilayer web is then uniaxially or biaxially drawn to produce the final multilayer optical film. Uniaxial drawing is performed in a tenter or a length orienter. Biaxial drawing typically includes both types of equipment. Typical tenters draw in a transverse direction (TD) to the web path, although certain tenters are equipped with mechanisms to draw or relax (shrink) the film dimensionally in the web path or machine direction (MD). Length orienters draw in the machine direction.

For example, a two step drawing process is used to orient the birefringent material in both in-plane directions. The draw processes can be any combination of the single step processes described above that allow drawing in two in-plane directions. In addition, a tenter that allows drawing along the machine direction, e.g. a biaxial tenter that can draw in two directions sequentially or simultaneously, can be used. In this latter case, a single biaxial draw process can be used.

Further processing can be done to incorporate opaque center layers by lamination. For example, multilayer optical film color mirror could be created with one opaque skin layer. This film could then be laminated to itself with the use of a hot melt or pressure sensitive adhesive, with the opaque skin layers combined to form a multilayer optical film with a center opaque layer.

The following examples demonstrate the manufacture and uses of multilayer optical films of the invention. It is to be understood that these examples are merely illustrative and are in no way to be interpreted as limiting the scope of the invention. In the examples, all parts, ratios and percentages are by weight unless otherwise indicated. All materials are commercially available, for example from Aldrich Chemicals (Milwaukee, Wis.), unless otherwise indicated or described.

TEST METHODS

Spectra

Transmission spectra of the film samples were taken using a UV/Visible spectrophotometer with a film-holding cell.

Tensile Testing

Tensile testing was done according to ASTM Method D882, using a 25.4 mm wide film sample with an initial grip separation of 101.6 mm and a rate of 50.8 mm/minute.

Intrinsic Viscosity

Intrinsic viscosity was measured per ASTM D4603-91 using a 60/40 mixture of phenol/o-dichlorobenzene as the solvent at 30° C.

Refractive Index

Refractive index was determined using a Metricon Prism coupler (Metricon Corporation, Pennington, N.J.).

Folding Endurance

An MIT Folding Endurance Tester was used according to ASTM D2176-97. The tester measures the number of folds to film breakage and separation.

Launderability

This film was laundered according to U.S. Bureau of Engraving and Printing Test Method STM 300.002.94a. The wash and rinse water temperature was 62° C.

Solvent Resistance

Solvent resistance was evaluated by physical inspection of the film samples after soaking in a variety of solvents for 24 hours at room temperature.

Differential Scanning Calorimetry

The glass transition and melting temperatures were determined using a Perkin-Elmer DSC-7 (Perkin-Elmer Corp., Norwalk, Conn.). An approximately 5 milligram sample of the film was placed in the instrument according to the manufacturer's instructions, then the temperature was taken from an initial temperature of −40° C. to 200° C. at 20° C./minute, then ramped back down to −40° C. at the same rate, then taken back up to 200° C. at the same rate. The calculations were made based on the second heating cycle. The melting temperature was taken to be the maximum value of the melt peak. The glass transition temperature was calculated using the midpoint of the glass transition deflection.

Tear Resistance

This test was a modification of a standard trouser tear test done on an Instron. A 76.2×76.2 mm film sample or a banknote was prepared with two parallel slits, 25.4 mm apart, extending from the approximate center of the sample to the edge, forming three legs on the sample. The two outer legs were put in one grip and the center leg was put in the other grip. The initial grip separation was 50.8 mm and the sample was pulled 50.8 mm at a rate of 254 mm/minute. These distances were adjusted as needed for banknotes. The average tearing force is calculated for the middle 80% of crosshead travel and is the average load divided by two, since there are two slits per sample. Table 5 summarizes the results.

Crumple Evaluation

To evaluate the crumple resistance and recovery of the banknotes or the potential banknote substrate materials, a new technique was developed. A modification was made to the Digimatic Indicator Model 1DF-112E (Mitutoyo, Japan), which measures the thickness of films. A 25.4 mm diameter polycarbonate disc of 7 mm thickness was made to fit over the 4.83 mm diameter shoe. This modification spreads the loading force over a larger area. Thus, for the same spring force, the stress pushing down to measure the film was 3.6% of the original force. For each 67×67 mm square, five measurements of the original film or paper thickness and the thickness of the sample following crumpling were recorded. These were done at the center and a position about 15 mm down and in from each corner. The average of these 5 measurements are reported in the tables of data that follow.

The crumpling of the samples was done with the IGT Crumple Tester, procured from Research North America, (Cherry Hill, N.J.). Eight crumples were done, rolling the sample alternately downweb and crossweb. The recovery of the crumpled samples was determined by placing the crumpled samples under precisely flat (<0.005 mm) stainless steel blocks of 323 g, 646 g and 969 g on a machinist's granite table with flatness of <0.005 mm for 24 hr, then measuring the samples again in the 5 positions and averaging.

Crease Recovery

Another approach to measure a film's ability to recover from creasing was adapted from the fiber industry (see the Encyclopedia of Polymer Science and Engineering, Vol. 5, p. 91–94, Wiley-Interscience, New York, 1986). A 12.3 mm wide sample of the film was bent over a defined radius for a period of 24 hr at 25° C., then the angle the film took after removing the 500 g load was measured immediately, one day later, and 14 days later. A zero degree angle correlates to the film bent in half, while a 180 degree angle correlates to a sample that is flat with no bend.

EXAMPLES

Monomers, catalysts, and stabilizers utilized in creating polymers for these examples are commercially available from the following suppliers: dimethyl naphthalene dicarboxylate from Amoco (Decatur, Ala.), dimethyl terephthalate (DMT) from Hoechst Celanese (Dallas, Tex.), ethylene glycol (EG) from Union Carbide (Charleston, W. Va.), 1,6-hexanediol (HD) from BASF (Charlotte, N.C.), triethylene glycol (TEG) from Celenese Ltd. (Dallas, Tex.), 2-butyl 2-ethyl 1,3-propanediol (BEPD) from Nesteoxo (Ghent Belgium), antimony triacetate from Elf Atochem (Philadelphia, Pa.), tetrabutyltitanate and triethylphosphonoacetate, both from Albright & Wilson (Glen Allen, Va.), polyethyleneglycol (PEG) from Union Carbide (Danbury, Conn.), trimethylolpropane (TMP) from Celenese Ltd. (Dallas, Tex.), sebacic acid (SA) from Arizona Chemical (Jacksonville, FL) and neopentyl glycol (NPG) from Eastman Chemical (Kingsport, Tenn.).

Example P1 (Preparation of PET)

The polyethylene terephthalate used in the following Examples can be synthesized in a batch reactor with the following raw material charge; 5,000 kg dimethyl terephthalate, 3,502 kg ethylene glycol, 1.2 kg manganese acetate, and 1.6 kg antimony triacetate. Under pressure of 1520 torr, this mixture is heated to 254° C. while removing the transesterification reaction by-product methanol. After 1,649 kg of methanol was removed, 2.45 kg of triethyl phosphonoacetate is charged to the reactor and than the pressure is gradually reduced to 1 torr while heating to 280° C. The condensation reaction by-product, ethylene glycol, is continuously removed until a polymer with an Intrinsic Viscosity of 0.60, as measured in 60/40 phenol/dichlorobenzene, is produced.

Example 1 (Preparation of Polymers—High Refractive Index Polymers)

Examples of CoPHT's containing comonomers for suppressing crystallization rates and Tg's are shown in Table I. These CoPHT's were cast into mono-layer film and oriented at the process conditions shown in Table II. Birefringence of these oriented CoPHT films was determined by measuring the refractive indices in orthoganol directions using a Metricon refractometer. The corresponding refractive indices and calculated birefringence are also shown in Table II.

TABLE 1 coPHT Thermal Properties

| Sample# | Comonomer Composition (mol %) | | | | Thermal Properties (° C.) | |
|---|---|---|---|---|---|---|
| | DMT | HD | PEG | TMP | Tm | Tg |
| A1 | 50 | 49.5 | 0 | 0.5 | 147 | 15 |
| A9 | 50 | 47.5 | 2 | 0.5 | 136 | −9.5 |
| A10 | 50 | 45.5 | 4 | 0.5 | 128 | −25 |
| A12 | 50 | 41.5 | 8 | 0.5 | 118 | −45 |

TABLE 1-continued coPHT Thermal Properties

| Sample# | Comonomer Composition (mol %) | | | | Thermal Properties (° C.) | |
|---|---|---|---|---|---|---|
| | DMT | HD | TEG | TMP | Tm | Tg |
| A2 | 50 | 48.5 | 1 | 0.5 | 142 | 16 |
| A3 | 50 | 47.5 | 2 | 0.5 | 143 | 15 |
| A4 | 50 | 45.45 | 4 | 0.55 | 141 | 14 |
| A5 | 50 | 41.5 | 8 | 0.5 | 137 | 14 |
| A6 | 50 | 39.5 | 10 | 0.5 | 135 | 12 |
| | DMT | HD | EG | TMP | Tm | Tg |
| E16 | 50 | 39.5 | 10 | 0.5 | 119 | 21 |
| | DMT | SA | HD | TMP | Tm | Tg |
| A13 | 48 | 2 | 49.5 | 0.5 | 139 | 9.5 |
| A15 | 47 | 3 | 49.5 | 0.5 | 134 | 5.8 |
| A14 | 46 | 4 | 49.5 | 0.5 | 129 | 2.7 |
| A20 | 45 | 5 | 49.5 | 0.5 | 132 | −2 |

TABLE 1-continued coPHT Thermal Properties

| Sample# | Comonomer Composition (mol %) | | | | Thermal Properties (° C.) | |
|---|---|---|---|---|---|---|
| | DMT | HD | NPG | TMP | Tm | Tg |
| A30 | 50 | 48 | 1.5 | 0.5 | 143 | 16.6 |
| 88-A3 | 50 | 46.5 | 3 | 0.5 | 141 | 14.9 |
| A29 | 50 | 43.5 | 6 | 0.5 | 138 | 18.4 |
| | DMT | HD | BEPD | TMP | Tm | Tg |
| 88-E1 | 50 | 47.5 | 2 | 0.5 | 141 | 14 |
| 88-E2 | 50 | 45.5 | 4 | 0.5 | 136 | 17 |
| | DMT | HD | TEG | TMP | Tm | Tg |
| A24 | 50 | 45.3 | 4 | 0.7 | 140 | 13.6 |
| A26 | 50 | 45.45 | 4 | 0.55 | 141 | 13.7 |
| A27 | 50 | 45.6 | 4 | 0.4 | 141 | 13.8 |
| A28 | 50 | 45.7 | 4 | 0.28 | 142 | 13.8 |

TABLE 2 coPHT Orientation and Optical Properties

| | Orientation Process Conditions | | | | | | Optical Properties | | | |
|---|---|---|---|---|---|---|---|---|---|---|
| Sample# | Preheat Temp (° C.) | Preheat Time (s) | Draw Ratios | Draw Rate (%/sec) | Heat Set Temp (° C.) | Heat Set Time (s) | $n_x$ | $n_y$ | $n_z$ | Birefringence $\Delta n$ |
| A1 | 125 | 20 | 3.4 × 3.4 | 1000 | 125 | 0 | 1.606 | 1.603 | 1.510 | 0.095 |
| A10-1 | 130 | 20 | 2 × 2 | 100 | 125 | 0 | 1.594 | 1.589 | 1.530 | 0.061 |
| A10-2 | 135 | 20 | 2.4 × 2.4 | 1000 | 125 | 0 | 1.608 | 1.586 | 1.523 | 0.074 |
| A3 | 120 | 25 | 2.8 × 2.8 | 1000 | 50 | 10 | 1.610 | 1.600 | 1.510 | 0.095 |
| A4 | 125 | 20 | 3 × 3 | 1000 | 125 | 0 | 1.604 | 1.600 | 1.515 | 0.087 |
| A5 | 120 | 25 | 3 × 3 | 1000 | 120 | 0 | 1.610 | 1.590 | 1.511 | 0.089 |
| E16-1 | 37 | 30 | 2.9 × 2.9 | 800 | 25 | 0 | 1.605 | 1.599 | 1.499 | 0.103 |
| E16-2 | 37 | 30 | 2.9 × 2.9 | 800 | 90 | 60 | 1.614 | 1.604 | 1.499 | 0.110 |
| A13 | 120 | 25 | 3.1 × 3.1 | 1000 | 120 | 0 | 1.607 | 1.589 | 1.508 | 0.090 |
| A15 | 120 | 25 | 2.8 × 2.8 | 1000 | 120 | 0 | 1.586 | 1.598 | 1.517 | 0.075 |
| A14 | 120 | 25 | 3.1 × 3.1 | 1000 | 120 | 0 | 1.588 | 1.581 | 1.519 | 0.066 |
| A20-1 | 120 | 30 | 3.5 × 3.5 | 1000 | 115 | 0 | 1.584 | 1.583 | 1.515 | 0.069 |
| A20-2 | 120 | 30 | 3.5 × 3.5 | 1000 | 115 | 60 | 1.585 | 1.582 | 1.513 | 0.070 |
| A20-3 | 120 | 30 | 3.5 × 3.5 | 1000 | 115 | 120 | 1.590 | 1.598 | 1.517 | 0.077 |
| A20-4 | 120 | 30 | 3.5 × 3.5 | 1000 | 100 | 60 | 1.591 | 1.581 | 1.512 | 0.074 |
| A20-5 | 120 | 30 | 3.5 × 3.5 | 1000 | 100 | 120 | 1.590 | 1.584 | 1.511 | 0.077 |
| A30 | 125 | 25 | 3 × 3 | 1000 | 130 | 0 | 1.607 | 1.600 | 1.518 | 0.086 |
| 88-A3 | 130 | 30 | 3.4 × 3.4 | 1000 | 130 | 0 | 1.605 | 1.594 | 1.518 | 0.082 |
| A29 | 130 | 20 | 3.1 × 3.1 | 1000 | 130 | 0 | 1.580 | 1.575 | 1.534 | 0.043 |
| 88-E1 | 125 | 25 | 3.4 × 2.8 | 1000 | 100 | 0 | 1.625 | 1.573 | 1.513 | 0.086 |
| 88-E2 | 125 | 25 | 3.6 × 2.8 | 1000 | 100 | 0 | 1.623 | 1.575 | 1.515 | 0.085 |
| A24-3 | 125 | 20 | 3.4 × 3.4 | 1000 | 125 | 0 | 1.616 | 1.599 | 1.510 | 0.097 |
| A26-3 | 125 | 20 | 3.4 × 3.4 | 1000 | 125 | 0 | 1.606 | 1.596 | 1.512 | 0.089 |
| A27-3 | 125 | 20 | 3.4 × 3.4 | 1000 | 125 | 0 | 1.602 | 1.600 | 1.511 | 0.090 |
| A28-3 | 125 | 20 | 3.4 × 3.4 | 1000 | 125 | 0 | 1.611 | 1.604 | 1.512 | 0.095 |
| A24-9 | 130 | 20 | 3.4 × 3.4 | 1000 | 130 | 30 | 1.609 | 1.589 | 1.515 | 0.084 |
| A24-10 | 130 | 20 | 3.4 × 3.4 | 1000 | 130 | 60 | 1.607 | 1.592 | 1.515 | 0.084 |

TABLE 2-continued coPHT Orientation and Optical Properties

| | Orientation Process Conditions | | | | | | Optical Properties | | | |
|---|---|---|---|---|---|---|---|---|---|---|
| Sample# | Preheat Temp (° C.) | Preheat Time (s) | Draw Ratios | Draw Rate (%/sec) | Heat Set Temp (° C.) | Heat Set Time (s) | $n_x$ | $n_y$ | $n_z$ | Birefringence $\Delta n$ |
| A26-7 | 130 | 20 | 3.4 × 3.4 | 1000 | 130 | 30 | 1.604 | 1.600 | 1.514 | 0.088 |
| A26-8 | 130 | 30 | 3.4 × 3.4 | 1000 | 130 | 60 | 1.604 | 1.586 | 1.514 | 0.081 |
| A27-4 | 135 | 30 | 2.8 × 2.8 | 1000 | 120 | 0 | 1.602 | 1.577 | 1.526 | 0.064 |
| A27-5 | 135 | 30 | 2.8 × 2.8 | 1000 | 120 | 60 | 1.596 | 1.582 | 1.528 | 0.061 |

Example 2

A multilayer optical film was constructed with first optical layers created from a low Tg copolyester with dicarboxylate subunits derived from 100 mol % dimethyl terephthalate, and glycol subunits derived from 97.55 mol % 1,6 hexane diol, 2 mol % triethylene glycol, and 0.45 mol % trimethylol propane, and second optical layers constructed of a modified polyolefin, Admer SE810, available from Mitsui Chemicals (Purchase, N.Y.).

The copolyester used to form the first optical layers was synthesized in a batch reactor with the following raw material charge: 100 kg dimethyl terephthalate, 93 kg 1,6-hexane diol, 3.1 kg triethylene glycol, 0.9 kg trimethylol propane, 50 g tetra butyl titanate, 30 g cobalt acetate, and 35 g antimony triacetate. Under pressure of 0.20 MPa, this mixture was heated to 254° C. while removing methanol. After 33 kg of methanol was removed, 35 g of triethyl phosphonoacetate was charged to the reactor and then the pressure was gradually reduced to 133 Pa while heating to 270° C.

The condensation reaction by-product, 1,6 hexane diol, was continuously removed until a polymer with an intrinsic viscosity of 0.86 dL/g, as measured in 60/40 wt. % phenol/o-dichlorobenzene, was produced. It was later determined that the copolyester composition as determined by NMR was 50% DMT, 49% HD and 1% TEG. The NMR peak for TMP is not distinctly separate from the other comonomer peaks. It had a Tg of 15° C. and a Tm of 142° C. This coPHT was coextruded with Admer SE810. The above described materials were coextruded through a multilayer melt manifold to create a stack of 61 alternating layers of first optical layers and second optical layers which were subsequently divided and re-stacked to form a stack of 121 layers, which were again divided and re-stacked to form a stack of 241 layers.

The Admer was processed at 6.8 kg/hr through a twin screw extruder at 200 rpm and a melt temperature of 204° C. The coPHT was extruded through a 32 mm single screw extruder at 9.1 kg/hr to alternate with every Admer layer and form the optical stack. A 25 mm extruder was used to deliver additional coPHT as skin layers at a rate of 9.1 kg/hr, forming a finished film of 241 layers (since the skin layers fuse with the outer optical layers of the same polymer, the total number of layers don't increase). The feedblock, multipliers and die were controlled at 204° C. The molten polymer stack was quenched with electrostatic pinning (wire diameter of 0.17 mm) of approximately 5.5 kV onto a casting wheel whose speed was 3.5 m/min and whose inlet water was controlled at 21° C.

The cast web was cut into 114 mm squares and loaded into a Karo IV Laboratory Film Stretcher. The sample was pre-heated for 30 seconds by impingement with 120° C. air, then biaxially drawn simultaneously at a temperature of 125° C. and a strain rate of 1000%/s to a finished draw ratio of 3×3. The finished film was 61 μm thick. The film was heat set at 125° C. for 60 seconds by holding it on all four sides.

The refractive index of the coPHT skin layers on both samples were measured in a Metricon device and found to have the following refractive indices: $n_x$=1.61, $n_y$=1.61, $n_z$=1.50. The spectrum of the sample is shown in FIG. 1.

Example 3

Figure 2:
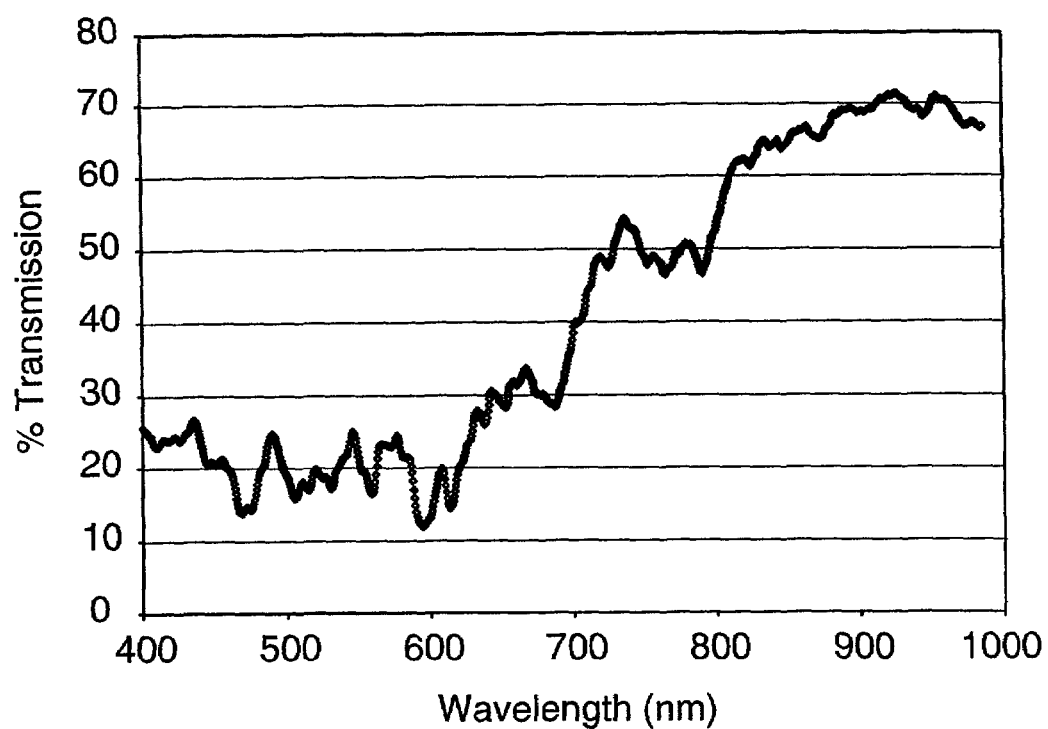
FIG. 2 is a graphical representation of % transmission vs. wavelength as described in Example 3.

Another sample was made in the same fashion as Example 2, but a third layer multiplier was used. The finished cast web contained 483 layers and was 635 μm thick. The extrusion rates were: coPHT 7.3 kg/hr, Admer SE810 5.5 kg/hr, and coPHT skins 91 kg/hr. This film was oriented in a similar fashion, but the draw ratio was 3.5×3.5 and the draw temperature was 125° C. The film was heat set for 60 seconds at 120° C. The finished sample was 53 μm thick. The spectrum of this film is shown in FIG. 2.

Example 4

Another sample was made in the same fashion as Example 3, but Regalite tackifier, available from Hercules (Wilmington, Del.), was metered into the twin screw extruder with the Admer SE810 resin. The extrusion rates were: coPHT 7.3 kg/hr, Admer SE810 4.4 kg/hr, 1.1 kg/hr of Regalite and coPHT skins 9.1 kg/hr. The cast film was 635 μm thick. This film was oriented in a similar fashion, but the draw ratio was 2.8×2.8 and the draw temperature was 125° C. The finished sample was 103 μm thick. The film was not heat set.

Example C5

A 224 layer multilayer optical film comprised of PET as the high refractive index polymer and coPMMA as the low index polymer was made on a sequential film line. The film was made to reflect near infrared light at normal incidence and red light at angles beyond the shift angle. This film had a clear to cyan appearance in transmitted light and was prepared in accordance with U.S. Pat. No. 6,045,894. The film was 40.6 μm thick.

Example C6

A sample of Dual Brightness Enhancement Film (DBEF) was used in the crumple test and the results are list in Table 5. DBEF is commercially available from 3M Company, St. Paul, Minn. and shattered into pieces and strands when subjected to the crumple test.

Example C7

Color-Shifting Optical Film with PET:PE-PO Layers.

An optical film was constructed with first optical layers created from a polyethylene terephthalate (PET) made by 3M Company, St. Paul, Minn. and second optical layers created from a polyolefin polymer poly(ethylene-co-octene) (PE-PO). The polymer is available under the product designation "Engage 8200" from Dow-DuPont Elastomers (Wilmington, Del.).

The above described polymers were then coextruded through a multilayer melt manifold to create a multilayer film with 224 alternating first and second optical layers. The cast film had a total thickness of about 533 μm. This particular multilayer reflective film also contained external protective layers made of the same polyethylene terephthalate as the first optical layers. The optical film was initially preheated, then stretched in the machine direction to a ratio of 3.8:1 at approximately 100° C., and then stretched in the transverse direction to a ratio of 3.6:1 approximately 100° C. to produce an optical film of approximately 38.6 μm.

The PET first optical layers were oriented by the process as determined by refractive index measurement of the external protective PET layers ($n_{MD}$=1.6766, $n_{TD}$=1.6400, $n_z$=1.4906). The second optical layers were essentially isotropic with a refractive index of about 1.49.

Example C8

IR Film with PET:PP-PE Layers.

An optical film was constructed with first optical layers created from a polyethylene terephthalate (PET) and second optical layers created from a polyolefin polymer poly(propylene-co-ethylene) (PP-PE), available under the product designation "Z9470" from Fina Oil and Chemical Co., Dallas, Tex.

The above described polymers were then coextruded through a multilayer melt manifold to create a multilayer film with 224 alternating first and second optical layers. The cast film had a total thickness of about 719 μm. This particular multilayer reflective film also contained external protective layers made of the same polyethylene terephthalate as the first optical layers. The optical film was initially preheated, then stretched in the machine direction to a ratio of 3.6:1 at approximately 100° C., and then stretched in the transverse direction to a ratio of 3.8:1 approximately 100° C. to produce an optical film of approximately 42.4 μm.

The PET first optical layers were oriented by the process as determined by refractive index measurement of the external protective PET layers ($n_{MD}$=1.6376, $n_{TD}$=1.6852, $n_z$=1.4860). The second optical layers were essentially isotropic with a refractive index of about 1.49.

Example C9

IR Film with PET:LLDPE-g-MA Layers.

An optical film was constructed with first optical layers created from a polyethylene terephthalate (PET) and second optical layers created from a functionalized polyolefin, linear low density polyethylene-g-maleic anhydride (LLDPE-g-MA), available under the product designation "Bynel 4105" from E. I. duPont de Nemours & Co., Inc. (Wilmington, Del.).

The above described polymers were then coextruded through a multilayer melt manifold to create a multilayer film with 224 alternating first and second optical layers. This particular multilayer reflective film also contained external protective layers made of the same polyethylene terephthalate as the first optical layers. The optical film was initially preheated, then stretched in the machine direction to a ratio of 3.6:1 at approximately 100° C., and then stretched in the transverse direction to a ratio of 3.8:1 approximately 100° C. to produce an optical film of approximately 40.9 μm.

The PET first optical layers were oriented by the process as determined by refractive index measurement of the external protective PET layers ($n_{MD}$=1.6378, $n_{TD}$=1.6847, $n_z$=1.4869). The second optical layers were essentially isotropic with a refractive index of about 1.49.

Tests to determine fitness for use as a currency substrate were then performed. The following Tables 3–7 compare the indicated examples to commercially available US $1 bills, Australian oriented polypropylene (OPP) $5 banknotes and other paper currencies.

Tensile Testing

TABLE 3

| Example | Material | Modulus (Mpa) | Break Stress (Mpa) | Break Elongation (%) |
| --- | --- | --- | --- | --- |
| 2 | CoPHT/Admer 241 layers | 559 | 34 | 122 |
| 3 | CoPHT/Admer 483 layers | 587 | 47 | 118 |
| 4 | CoPHT/Admer 483 layers | 432 | 20 | 78 |
| COMP. EX. 5 | PET/coPMMA | 3758 | 182 | 133 |
| Ex. 1, E1 | CoPHT monolayer | 940 | 62.5 | 138 |
| Ex. 1, E2 | CoPHT monolayer | 661 | 36 | 83 |
| Ex. 1, A24-10 | CoPHT monolayer | 751 | 42 | 77 |
| Ex. 1, A26-7 | CoPHT monolayer | 938 | 76.5 | 129 |
| Ex. 1, E16-2 | CoPHT monolayer | 3023 | 63 | 86 |
| Australian $5 bill | UCB blown OPP | 1428 | 97 | 51 |
| New US $1 bill | Crane cotton rag paper | 2759 | 43 | 7.2 |
| Old US $1 bill | Crane cotton rag paper | 1083 | 14 | 5.8 |
| UK £5 note | Portals cotton rag paper | 2207 | 17 | 5.3 |

The results in Table 3 show that the films of this invention have break strengths comparable to or higher than paper banknotes and exhibit considerably higher break elongations. Depending upon the copolymer composition, the modulus of the copolyester component may be varied to fit the end use requirements. In the case of a banknote, a degree of stiffness is desirable for the sheet-fed printing operation, cash handling equipment and simply handing the banknote to another person.

Folding Endurance

TABLE 4

| Example | Material | No. of Folds | Log No. Folds |
| --- | --- | --- | --- |
| 2 | CoPHT/Admer | 141,011 | 5.15 |
| 4 | CoPHT/Admer | 248,934 | 5.40 |
| COMP. EX. 5 | PET/coPMMA | 150,623 | 5.18 |
| Australian $5 bill | UCB blown OPP | >200,000 | >5.30 |
| New US $1 bill | Cotton rag paper | 1,708 | 3.23 |
| Old US $1 bill | Cotton rag paper | 731 | 2.86 |
| New Italian 1000 Lire | Cotton rag paper | 148 | 2.17 |
| Swiss Franc | Cotton rag paper | 445 | 2.65 |
| Finnish Markkaa | Cotton rag paper | 393 | 2.59 |

The results of Table 4 show that all polymer films can endure many more repetitive folds than paper banknotes.

Crumple Evaluation

TABLE 5

| Samples | Un-crumpled (μm) | Crumpled (μm) | After 1 Day (323 g) (μm) | After 1 Day (646 g) (μm) | After 1 Day (969 g) (μm) |
|---|---|---|---|---|---|
| New $1 US | 117 | 750 | 636 | 615 | 581 |
| New $1 US | 117 | 841 | 780 | 784 | 599 |
| Used $1 US | 167 | 663 | 557 | 592 | 465 |
| Used $1 US | 222 | 589 | 550 | 493 | 493 |
| Swiss Franc | 123 | 764 | 755 | 737 | 675 |
| Korean 1000 | 140 | 569 | 569 | 570 | 445 |
| New Australian $5 | 132 | 578 | 473 | 385 | 358 |
| Old Australian $5 | 129 | 749 | 732 | 397 | |
| Blown UCB OPP | 50 | 426 | 409 | 332 | 295 |
| Luminus 100 | 124 | 828 | | 697 | 704 |
| DuraNote | 107 | 1099 | 1006 | 982 | 848 |
| Teslin 7 mil | 184 | 944 | 886 | 875 | 834 |
| Yupo | 107 | 592 | 511 | 505 | 389 |
| COMP. EX. 5 PET/coPMMA | 44 | 1036 | 798 | 657 | 646 |
| COMP. EX. 5 with 0.8 mil EAA Skin Layers | 107 | 992 | 853 | 856 | 750 |
| COMP. EX. 5 with 1.2 mil paper skins | 199 | 918 | 767 | 715 | 719 |
| Ex. 2 coPHT/Admer 241 layers | 61 | 149 | 174 | 167 | |
| Ex. 3 coPHT/Admer 483 layers | 69 | 243 | 260 | 184 | 175 |
| Ex. 4 coPHT/Admer 483 layers | 73 | 291 | 270 | 209 | |
| Ex.6 coPHT/Elvax 151 layers | 51 | 347 | 419 | 375 | 282 |
| Ex. 7 coPHT/Bynel 151 layers | 75 | 416 | 408 | 342 | 325 |
| Ex. 9 coPHT/Admer 151 layers | 77 | 443 | 376 | 423 | 217 |
| Ex. 18 coPHT/Admer polarizer | 118 | 544 | | | |
| Ex. C6 DBEF polarizer film* | 130 | | | | |
| Ex. 1 A1 PHT | 85 | 767 | 846 | 902 | 448 |
| Ex. 1, E16-1 | 93 | 604 | 552 | 440 | |
| Ex. 1, A5 | 56 | 452 | 435 | 416 | 308 |
| Ex. 1, A13 | 71 | 470 | 466 | 458 | 394 |
| Ex. 1, A14 | 79 | 495 | | | 410 |
| Ex. 1, A15 | 109 | 830 | | | 667 |
| Ex. 1, A27 | 136 | 1429 | 1277 | 1100 | 1160 |
| Ex. 1, A-24 coPHT | 66 | 539 | 521 | 486 | 515 |
| Ex. 1, 88 E-2 | 115 | 1004 | 846 | 784 | 859 |
| Ex. 1, 88 A-3 | 80 | 804 | 790 | 565 | 616 |
| Admer | 115 | 150 | 136 | 153 | 173 |
| Elvax 3174 | 95 | 198 | 193 | 173 | 195 |
| Bynel | 113 | 164 | 129 | 130 | 130 |
| Ex. C7 PET/Engage | 39 | 270 | 265 | 226 | 241 |
| Ex. C8 PET/Bynel | 43 | 545 | 611 | 480 | 395 |
| Ex. C9 PET/Fina** | 46 | 488 | 473 | 492 | 332 |
| 0.92 mil PET | 25 | 370 | 393 | 351 | 334 |
| 1.40 mil PET | 37 | 659 | 682 | 628 | 533 |
| 1.97 mil PET | 50 | 1036 | 926 | 923 | 827 |
| 2.91 mil PET | 76 | 1574 | 1830 | 1707 | 1653 |
| 3.60 mil PET*** | | | | | |

*Film tatters upon crumpling
**Layers separate upon crumpling
***Film too stiff to crumple The first thing to note in studying the data in Table 5 is the large dependence of the crumpled thickness on initial thickness. This is to be expected, as the stiffness of a film increases with the cube of its thickness, while the spring force acting to push the sample flat is constant. The stiffness of a crumpled sample in the thickness direction is an unknown function. That stated, one must be very careful drawing conclusions unless the sample thicknesses are quite similar.

A film commonly available in numerous thicknesses, PET, was studied in the crumple test. This data is found at the bottom of the table. The crumpled thickness varies from 370 μm to 1574 μm as the thickness changes from 25 μm to 76 μm. One could make comparisons between samples by comparing the ratio of crumpled to uncrumpled thicknesses.

To minimize the dependence of crumple data on thickness and demonstrate the advantage of the low Tg coPHT, compare Example 1, A14 to 2.91 mil PET. The crumpled thickness of coPHT is about one third that of PET. To compare the preferred multilayer optical films of this invention to conventional multilayer optical film art, Example 6 shows about one third the crumpled thickness of COMP. EX. 5.

As one can see from Table 5, the ethylene copolymers Admer, Elvax and Bynel films by themselves are crumple resistant. Although lines of creasing are evident following the test, these creases are not protruding. The coPHT monolayer films are similar to biaxially oriented polypropylene (see the Australian banknote and blown UCB OPP data). Polyester films, including the Domtar Banknote sample labeled Luminous 100 and the PET/coPMMA MOF of Comparative Example COMP. EX. 5 show permanent creasing. The Luminous sample has a 12 μm PET core, with 30 μm paper laminated to each side. This approach was also tried with the clear to cyan MOF (COMP. EX. 5). For the case of this PET/coPMMA layered sample, the absolute crumple recovery is not improved even when ethylene copolymer (EAA, Primacor 3330, DuPont) skin layers are added later to this film. The color shift is very dramatic with these materials, and in higher currency denominations, where crumpling does not generally occur, it might be utilized. The same might be said of the films of Comparative Examples C6–C8, comprising PET with olefin copolymers. In this case, the crumple properties are better than PET, but still inferior to the preferred copolyester samples of this invention.

For the more commonly used denominations, where crumple recovery is very important, the preferred films of this invention, comprising coPHT alternately layered with olefin copolymers, show a flatness intermediate between this improved polyester (monolayer coPHTs) and the ethylene copolymer monolayer films, which is a significant improvement over the PET or PEN based birefringent multilayer optical films known in the art.

Crease Recovery

Referring to Table 6, it can be seen that for any radius, the preferred films of this invention (Example 2) are the best at returning toward flatness (180 degrees). This is especially evident for the tightest radius, which is most similar to the folding back on itself that the crumple test imposes on the papers or films. It also shows that the films of this invention get 75% of their recovery in one day. Tyvek is available from DuPont, Wilmington, Del.

TABLE 6

| | 0.19 mm Radius | | |
|---|---|---|---|
| | Initial | 1 Day | 14 Days |
| US New | 70 | 94 | 104 |
| US Used | 90 | 119 | 133 |
| Australian | 63 | 125 | 145 |
| Tyvek | 88 | 105 | 113 |
| COMP. EX. 5 | 86 | 123 | 138 |
| COMP. EX. 5 with EAA skin layers | 87 | 130 | 146 |
| Ex. 2 coPHT/Admer 241 layers | 57 | 151 | 170 |

TABLE 6-continued

| | 0.38 mm Radius | | |
| --- | --- | --- | --- |
| | Initial | 1 Day | 14 Days |
| US New | 73 | 98 | 95 |
| US Used | 79 | 115 | 128 |
| Australian | 55 | 113 | 150 |
| Tyvek | 83 | 118 | 125 |
| COMP. EX. 5 | 111 | 146 | 153 |
| COMP. EX. 5 with EAA skin layers | 107 | 140 | 157 |
| Ex. 2 coPHT/Admer 241 layers | 93 | 158 | 180 |

| | 0.76 mm Radius | | |
| --- | --- | --- | --- |
| | Initial | 1 Day | 14 Days |
| US New | 51 | 95 | 113 |
| US Used | 79 | 120 | 138 |
| Australian | 61 | 142 | 174 |
| Tyvek | 64 | 119 | 142 |
| COMP. EX. 5 | 65 | 122 | 143 |
| COMP. EX. 5 with EAA skin layers | 108 | 147 | 162 |
| Ex. 2 coPHT/Admer 241 layers | 78 | 176 | 180 |

| | 1.52 mm Radius | | |
| --- | --- | --- | --- |
| | Initial | 1 Day | 14 Days |
| US New | 68 | 113 | 140 |
| US Used | 84 | 134 | 145 |
| Australian | 70 | 154 | 174 |
| Tyvek | 94 | 136 | 161 |
| COMP. EX. 5 | 140 | 155 | 170 |
| COMP. EX. 5 with EAA skin layers | 120 | 159 | 172 |
| Ex. 2 coPHT/Admer 241 layers | 86 | 180 | 180 |

Figure 3:
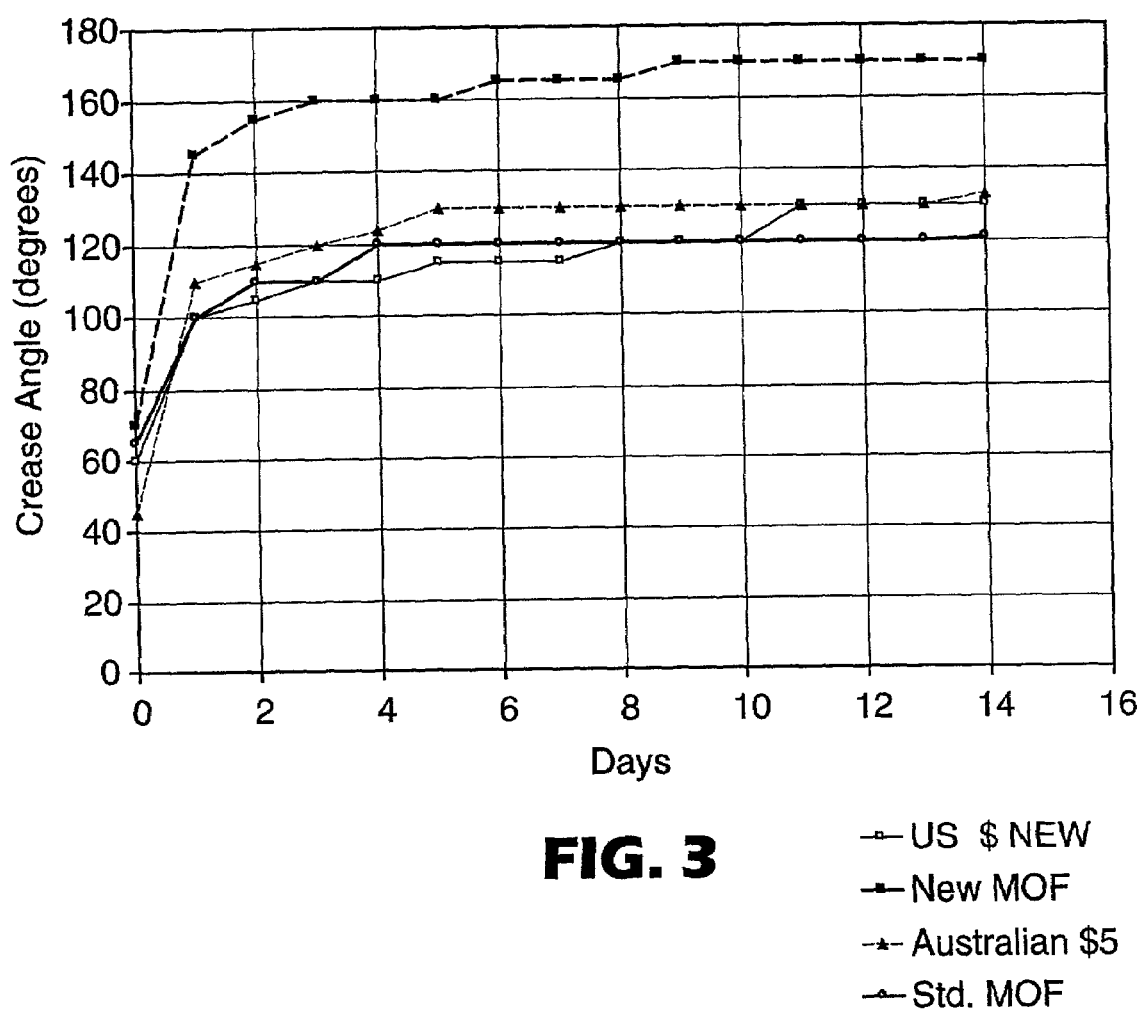
FIG. 3 is a graphical representation of crease angle (degrees) vs. days for 4 articles as described in Examples 2 and C5.

For some selected samples, the change in angle was tracked for the 0.19 mm radius every day over the two-week period. FIG. 3 shows the film of Example 2 exhibits a marked improvement over US paper currency, OPP film, or Example C5. It was considered to be acceptable if recovery was within 24 to 48 hours to at least 140° following a creasing under a 500 gram load over a 0.19 mm radius.

Tear Resistance

Another property banknote substrates should have is tear resistance. It is well-known that plastic films, including OPP and PET are difficult to tear because of their high resistance to tear initiation. Unless a nick or defect already exists along the edge, one cannot tear the sample. Instead, the film stretches under load. This is also well-known in the banknote industry for the OPP banknotes compared to paper ones. OPP and PET have very little resistance to tear propagation, however. The preferred films of this invention exhibit marked improvement in resistance to tear propagation as shown in Table 7.

TABLE 7

| Sample | Thickness (Micrometers) | Avg. Tearing Force (N) | Normalized Tearing Force (N/mm) |
| --- | --- | --- | --- |
| Example 2 | 61 | 3.10 | 50.8 |
| Example 3 | 53 | 0.50 | 9.5 |
| Example 4 | 103 | 2.16 | 21.1 |
| Example COMP. EX. C5 | 46 | 0.17 | 3.7 |
| US $1 | 117 | 0.86 | 7.4 |
| UK 5£ | 109 | 1.32 | 12.0 |
| AUS $5 | 99 | 0.19 | 1.9 |

Table 7 summarizes the results, for banknotes, the numbers shown are measured in the long dimension.

It can be seen that the preferred films of this invention exhibit a greater resistance to tear propagation than paper banknotes or the Australian banknotes.

Solvent Resistance

Another test that banknotes are subjected to is chemical resistance. Some results are shown in Table 8.

TABLE 8

Results for 24 Hour Chemical Soak Test

| Chemical Tested | Example 2 | Comparative Example 5 |
| --- | --- | --- |
| 1% sulfuric acid | No effect | No effect |
| 2% sodium hydroxide | No effect | No effect |
| 5.25% sodium Hypochlorite (Household bleach) | No effect | No effect |
| Ethanol | No effect | Cracks from swelling stresses are noticeable |
| Perchloroethylene | Slightly hazy | Very slight color shift at edges |
| Toluene | Surface textured, slightly hazy | Film swollen, coPMMA layer dissolution, purplish color |
| Acetone | No effect | Film falls apart into thin layers |
| Gasoline | Yellows and gets slightly hazy | 1–2 mm yellow border at edges |
| Mineral Spirits | No effect | No effect |

Banknotes are expected to hold up to common chemicals. The preferred films of this invention hold up to these better than the PET/coPMMA films of Example COMP. EX. 5. In the latter case, some chemicals show an edge diffusion effect, exposure to ethanol creates small cracks from the edge of the sample toward the center, and soaking in toluene dissolves the coPMMA and changes the film from a vivid clear to cyan to a weak purple to yellow color shift. Acetone caused the layers to fall apart. The worst event seen for Example is some yellowing, surface texturing and slight haziness.

Launderability

Launderability is another test used to evaluate banknote durability. After the launderability test, the film of Example 2 showed no deleterious effects, while Example COMP. EX. 5 showed permanent creasing.

Example 5

A multilayer optical film was constructed with first optical layers created from a low Tg copolyester with dicarboxylate subunits derived from 100 mol % dimethyl terephthalate, and glycol subunits derived from 95.3 mol % 1,6 hexane diol, 4 mol % triethylene glycol, and 0.7 mol % trimethylol propane, and second optical layers constructed of a modified polyolefin, Elvax 3174, available from Dupont.

The copolyester used to form the first optical layers was synthesized in a batch reactor with the following raw material charge: 105 kg dimethyl terephthalate, 93 kg 1,6-hexane diol, 6.6 kg triethylene glycol, 1 kg trimethylol propane, 45 g tetrabutyltitanate, and 20 g cobalt acetate. Under pressure of 0.20 MPa, this mixture was heated to 254° C. while removing methanol. After 35 kg of methanol was removed, 35 g of triethyl phosphonoacetate was charged to the reactor and then the pressure was gradually reduced to 133 Pa while heating to 270° C. The condensation reaction by-product, 1,6 hexane diol, was continuously removed until a polymer with an intrinsic viscosity of 0.88 dL/g, as measured in 60/40 wt. % phenol/o-dichlorobenzene, was produced.

Figure 4:
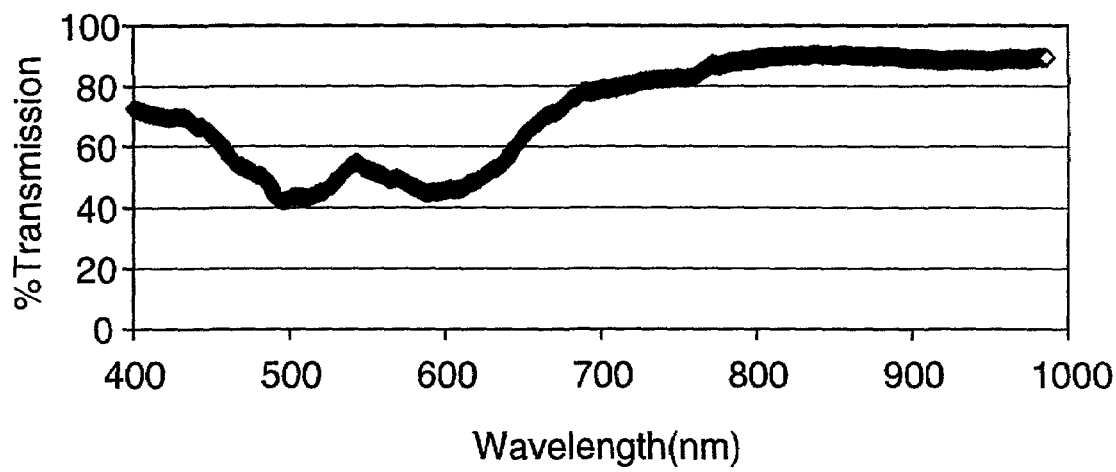
FIG. 4 is a graphical representation of % transmission vs. wavelength as described in Example 5.

The above described materials were coextruded through a multilayer melt manifold to create a stack of 151 alternating layers of first optical layers and second optical layers. The melt manifold and die were controlled at 199° C. The Elvax 3174 was extruded at 204° C. and 6.4 kg/hr and the coPHT at 204° C. and 7.3 kg/hr. Skin layers were formed by splitting the 204° C., 11.4 kg/hr melt stream of Fina polypropylene grade 3860x approximately equally on either side of the optical stack to form a cast web with 151 total layers and a total thickness of 305 μm. The casting wheel speed was 3.7 m/min and the inlet water temperature was 10° C. This cast web was then heated by impingement with hot air at 130° C. for 25 seconds and then oriented simultaneously in two directions at a draw rate of 1000%/sec to a final draw ratio of 3×3. The resulting 33 μm thick film was colorful and reflected light with wavelengths of 450–650 nm as measured by a spectrophotometer and shown in FIG. 4.

Example 6

A multilayer optical film was constructed in a similar fashion to Example 5, except that the same coPHT used as the optical layers also formed the skin layers.

Figure 5:
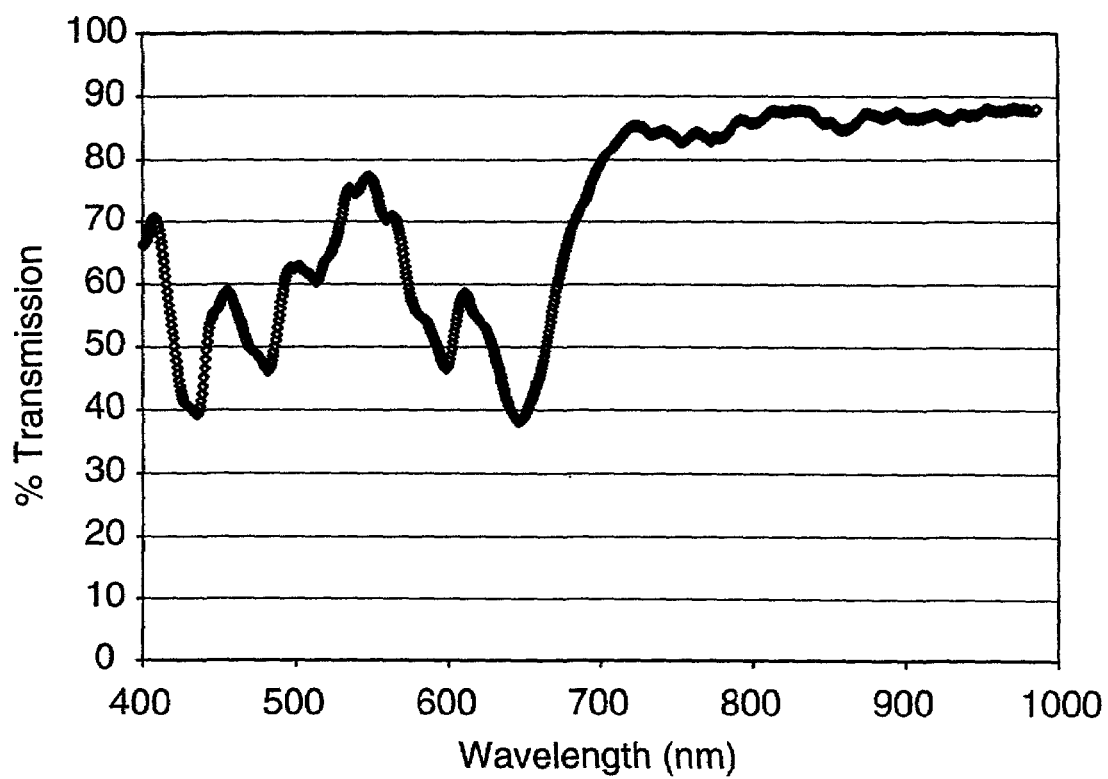
FIG. 5 is a graphical representation of % transmission vs. wavelength as described in Example 6.

The above described materials were coextruded through a multilayer melt manifold to create a stack of 151 alternating layers of first optical layers and second optical layers. The melt manifold and die were controlled at 199° C. The Elvax 3174 was extruded at 204° C. and 6.4 kg/hr and the coPHT at 204° C. and 7.3 kg/hr. Skin layers were formed by splitting the 204° C., 11.4 kg/hr melt stream of the same coPHT as used in Example 5 approximately equally on either side of the optical stack to form a cast web with 151 total layers and a total thickness of 635 μm. The casting wheel speed was 3.0 m/min and the inlet water temperature was 10° C. This cast web was then heated by impingement with hot air at 125° C. for 25 seconds and then oriented simultaneously in two directions at a draw rate of 50%/sec to a final draw ratio of 3×3. The resulting 33 μm thick film was colorful and reflected light with wavelengths of 450–650 nm as measured by a spectrophotometer and shown in FIG. 5.

Example 7

A multilayer optical film was constructed with first optical layers created from a low Tg copolyester with dicarboxylate subunits derived from 100 mol % dimethyl terephthalate, and glycol subunits derived from 95.3 mol % 1,6 hexane diol, 4 mol % triethylene glycol, and 0.7 mol % trimethylol propane, and second optical layers constructed of a modified polyolefin, Bynel E418, available from Dupont Chemicals.

Figure 6:
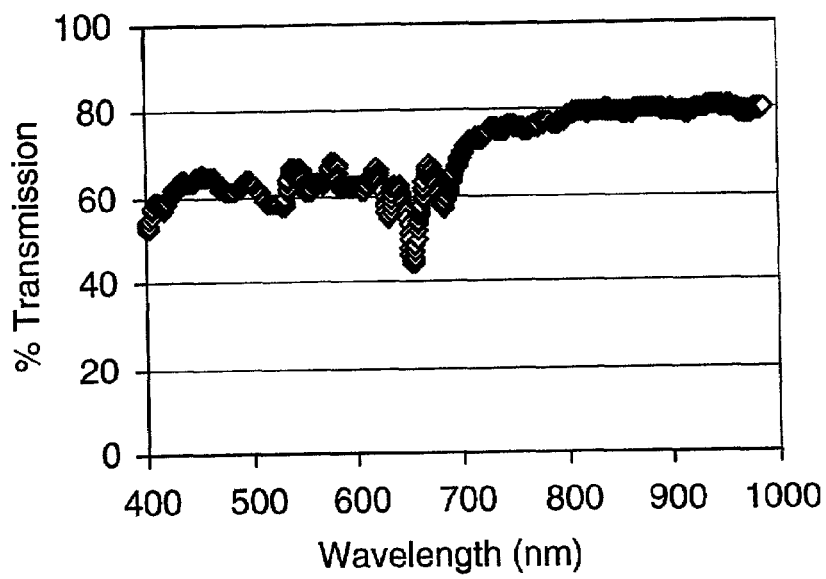
FIG. 6 is a graphical representation of % transmission vs. wavelength as described in Example 7.

The copolyester used to form the first optical layers was synthesized as described in Example 3. These materials were coextruded through a multilayer melt manifold to create a stack of 151 alternating layers of first optical layers and second optical layers. The multilayer melt manifold and film die were controlled to 199° C. The Bynel E418 was extruded at 204° C. and 6.8 kg/hr, the coPHT at 204° C. and 6.8 kg/hr. Skin layers of the same coPHT resin were formed by splitting the 204° C., 11.4 kg/hr melt stream from a third extruder approximately equally on either side of the optical stack to form a cast web with 151 total layers and a total thickness of 381 μm. The casting wheel speed was 2.7 m/min and the temperature of the water entering was 10° C. The electrostatic pinning conditions were similar to Example 1. This cast web was then heated by impingement with hot air at 125° C. for 30 seconds and then oriented simultaneously in two directions at a draw rate of 1000%/sec to a final draw ratio of 3×3. The resulting 71 μm thick film was colorful and reflected light with wavelengths of 400–700 nm as measured by a spectrophotometer and shown in FIG. 6.

Example 8

A multilayer optical film was constructed with first optical layers created from a low Tg copolyester with dicarboxylate subunits derived from 100 mol % dimethyl terephthalate, and glycol subunits derived from 95.3 mol % 1,6 hexane diol, 4 mol % triethylene glycol, and 0.7 mol % trimethylol propane, and second optical layers constructed of a modified polyolefin, Admer SE810, available from Mitsui Chemicals.

Figure 7:
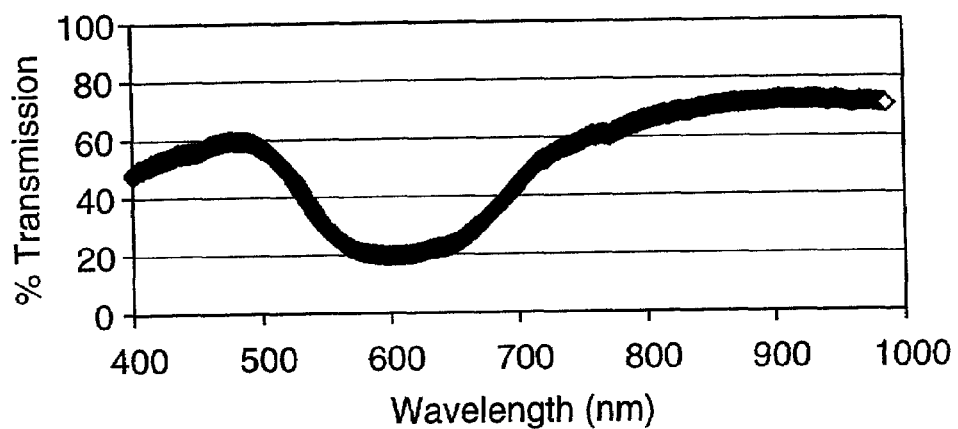
FIG. 7 is a graphical representation of % transmission vs. wavelength as described in Example 8.

The copolyester used to form the first optical layers was synthesized as described in Example 4. These materials were coextruded through a multilayer melt manifold to create a stack of 151 alternating layers of first optical layers and second optical layers. The multilayer melt manifold and film die were controlled to 199° C. The Admer SE810 was extruded at 204° C. and 5.5 kg/hr, the coPHT at 204° C. and 8.2 kg/hr. Skin layers of the same coPHT resin were formed by splitting the 204° C., 11.4 kg/hr melt stream from a third extruder approximately equally on either side of the optical stack to form a cast web with 151 total layers and a total thickness of 305 μm. The casting wheel speed was 3.0 m/min and the temperature of the water entering was 10° C. The electrostatic pinning conditions were similar to Example 1. This cast web was then heated by impingement with hot air at 125° C. for 15 seconds and then oriented simultaneously in two directions at a draw rate of 1000%/sec to a final draw ratio of 2.7×2.7. The resulting 48 μm thick film was colorful and reflected light with wavelengths of 550–700 nm as measured by a spectrophotometer and shown in FIG. 7.

Example 9

A multilayer optical film was constructed with first optical layers created from a low Tg copolyester with dicarboxylate subunits derived from 100 mol % dimethyl terephthalate, and glycol subunits derived from 95.3 mol % 1,6 hexane diol, 4 mol % triethylene glycol, and 0.7 mol % trimethylol propane, and second optical layers constructed of a modified polyolefin, Admer SE810.

The copolyester used to form the first optical layers was synthesized as described in Example 6.

Figure 8:
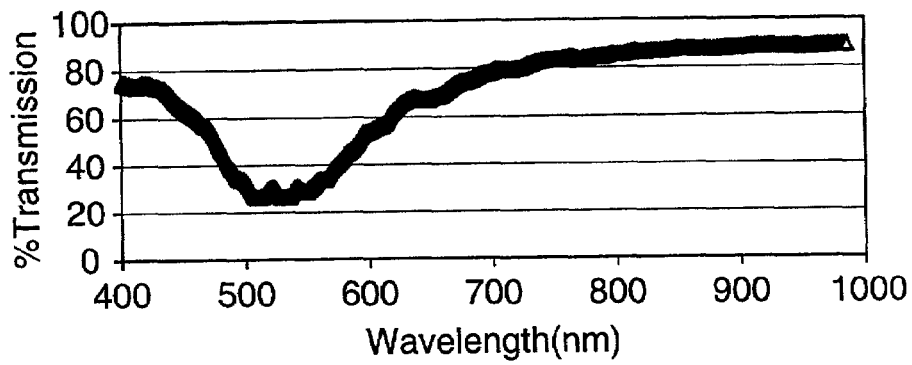
FIG. 8 is a graphical representation of % transmission vs. wavelength as described in Example 9.

These materials were coextruded through a multilayer melt manifold to create a stack of 151 alternating layers of first optical layers and second optical layers. An additional set of external protective skin layers made from Fina 3860 polypropylene were coextruded on either side of the optical stack to form a cast web with 151 total layers and a total thickness of 635 μm. This cast web was then heated by impingement with hot air at 125° C. for 25 seconds and then oriented simultaneously in two directions at a draw rate of 1000%/sec to a final draw ratio of 3.0×3.0. The resulting 76 μm thick film was colorful and reflected light with wavelengths of 450–600 nm as measured by a spectrophotometer and shown in FIG. 8.

Example 10

PP/Si PSA

A low Tg multilayer optical film could be constructed with first optical layers created from a semi-crystalline polypropylene such as Fina 3860 which can be blended with Fina 3374 to attain the desired viscosity match, and second optical layers constructed of a silicone based polymer available from Dow Corning (Midland, Mich.) such as BIO-PSA silicone hot melt adhesive.

These materials could be coextruded through a multilayer melt manifold to create a stack of 275 alternating layers of first optical layers and second optical layers. An additional set of external protective skin layers made from polypropylene (Fina 3860) would be coextruded on either side of the optical stack to form a cast web with 275 total layers and a total thickness of 635 µm. This cast web is then heated by impingement with hot air at 135° C. for 25 seconds and then oriented simultaneously in two directions at a draw rate of 1000%/sec to a final draw ratio of 3×3.

Example 11

PP/Polyurea Silicone

A low Tg multilayer optical film could be constructed with first optical layers created from semi-crystalline polypropylene blends available from Fina, and second optical layers constructed of a polyurea silicone based polymer manufactured by 3M.

These materials could be coextruded through a multilayer melt manifold to create a stack of 275 alternating layers of first optical layers and second optical layers. An additional set of external protective skin layers made from polypropylene (Fina 3860) would be coextruded on either side of the optical stack to form a cast web with 275 total layers and a total thickness of 635 µm. This cast web is then heated by impingement with hot air at 135° C. for 25 seconds and then oriented simultaneously in two directions at a draw rate of 1000%/sec to a final draw ratio of 3×3.

Example 12

Carbon Black Filled Center Layer

A low Tg multilayer optical film could be created as described in Example 1 with the exception that the coextrusion feedblock is modified to allow coextrusion of an opaque center layer containing carbon black filled particles. Alternatively, two multilayer films could be coextruded with each having one carbon black filled skin layer. The two multilayer optical films could than be laminated together with the carbon black filled layer (13) internal as shown in FIG. 9.

After coextrusion/lamination and orientation of the above multilayer optical film construction, patterns including letters and numbers could be embossed into the film. The embossing would thin the optical film layers designed to reflect a specific wavelength of light. When embossed to reflect wavelengths of light in the 550–700 nm range, the reflected light with the black background will appear gold at normal angles. Side view of embossed layer construction is shown in FIG. 10, illustrating the embossed sections 21, 26. The center non-optical layer 202 could be a carbon black containing layer or it could be substituted with a "black dye". This "black" dye could also be polymerizable to prevent loss of the dye with time and changes in color. This non-optical layer 202 could be a printed layer, it could be a pigmented layer, as well as the dye or carbon black layer described above. The surrounding areas of the film 22, 25 or 27, 201 are unembossed portions of the film. The embossed areas 21 and 26 are comprised of the same film as in the unembossed areas, although the film layers 23, 24, 28, 29 are compressed.

Example 13

TiO$_2$ filled Center Layer

A low Tg multilayer optical film could be created as described in Example 1 with the exception that the coextrusion feedblock is modified to allow coextrusion of an opaque center layer containing TiO$_2$ filled particles. Alternatively, two multilayer films could be coextruded with each having one TiO$_2$ filled skin layer. The two multilayer optical films could than be laminated together with the TiO$_2$ filled layer (13) internal as shown in FIG. 9.

After coextrusion/lamination and orientation of the above multilayer optical film construction, patterns including letters and numbers could be embossed into the film. The embossing would thin the optical film layers designed to reflect a specific wavelength of light. When embossed to reflect wavelengths of light in the 550–700 nm range, the reflected light with the white background will appear cyan at normal angles.

Side view of embossed layer construction is shown in FIG. 10, illustrating the embossed sections 21, 26. The center non-optical layer 202 could be a layer containing TiO$_2$ or other opaque material. This non-optical layer 202 could be a printed layer, it could be a pigmented layer, as well as the dye or TiO$_2$ containing layer described above. The surrounding areas of the film 22, 25 or 27, 201 are unembossed portions of the film. The embossed areas 21 and 26 are comprised of the same film as in the unembossed areas, although the film layers 23, 24, 28, 29 are compressed.

Example 14

Green to Black

Figure 11:
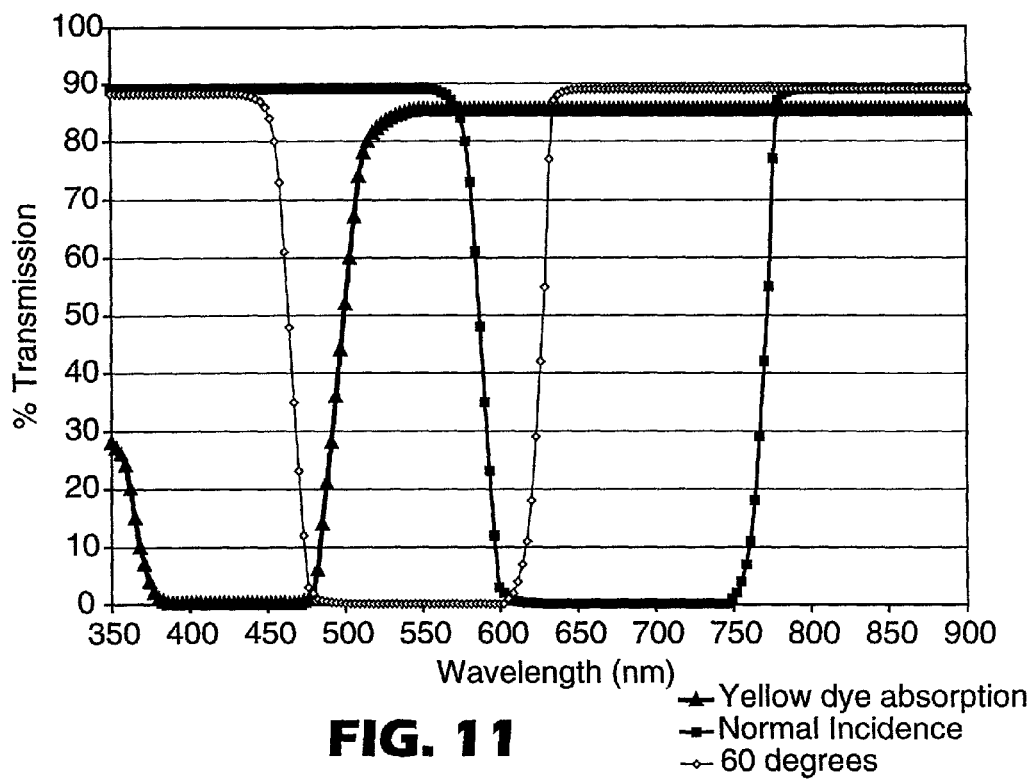
FIG. 11 is a graphical representation of % transmission vs. wavelength as described in Example 14.

A multilayer optical film could be constructed as described in Example 2 with the CoPHT containing a "yellow" dye that absorbs light in the 400–500 nm wavelength range. This "yellow dye" could be a polymerizable dye to prevent migration of the dye and changes in color with time. If the multi-layer optical film were designed with layer thicknesses to reflect light in the 600–750 nm wavelength range, the film would appear green at normal angle transmissions and black at off angle transmissions as shown in FIG. 11. However, depending on the position of the upper band edge, the film could allow red light to pass at grazing incidence, giving a green to black to red appearance.

Example 15

Red to Yellow

Figure 12:
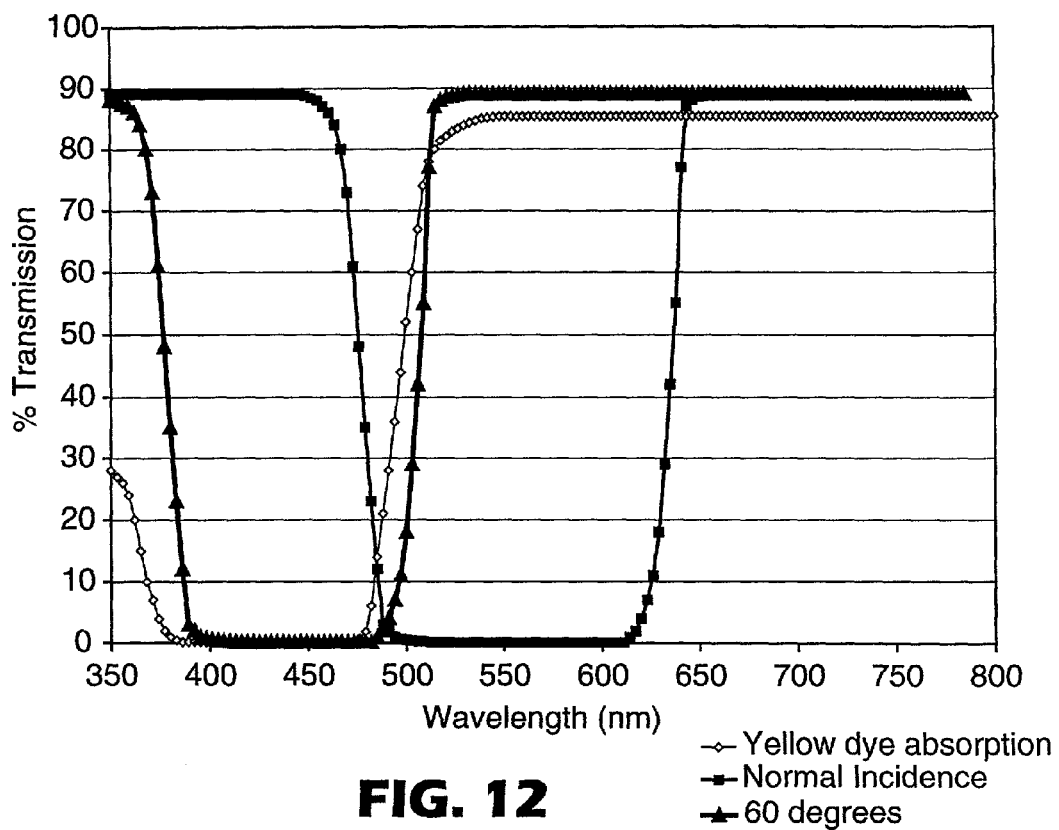
FIG. 12 is a graphical representation of % transmission vs. wavelength as described in Example 15.

A multilayer optical film could be constructed as described in Example 2 with the CoPHT containing a "yellow" dye that absorbs light in the 400–500 nm wavelength range. This "yellow dye" could be a polymerizable dye to prevent migration of the dye and changes in color with time. If the multi-layer optical film were designed with layer thicknesses to reflect light in the 490–630 nm wavelength range, the film would appear red at normal angle transmissions and yellow at off angle transmissions as shown in FIG. 12.

Example 16

Yellow to Green

Figure 13:
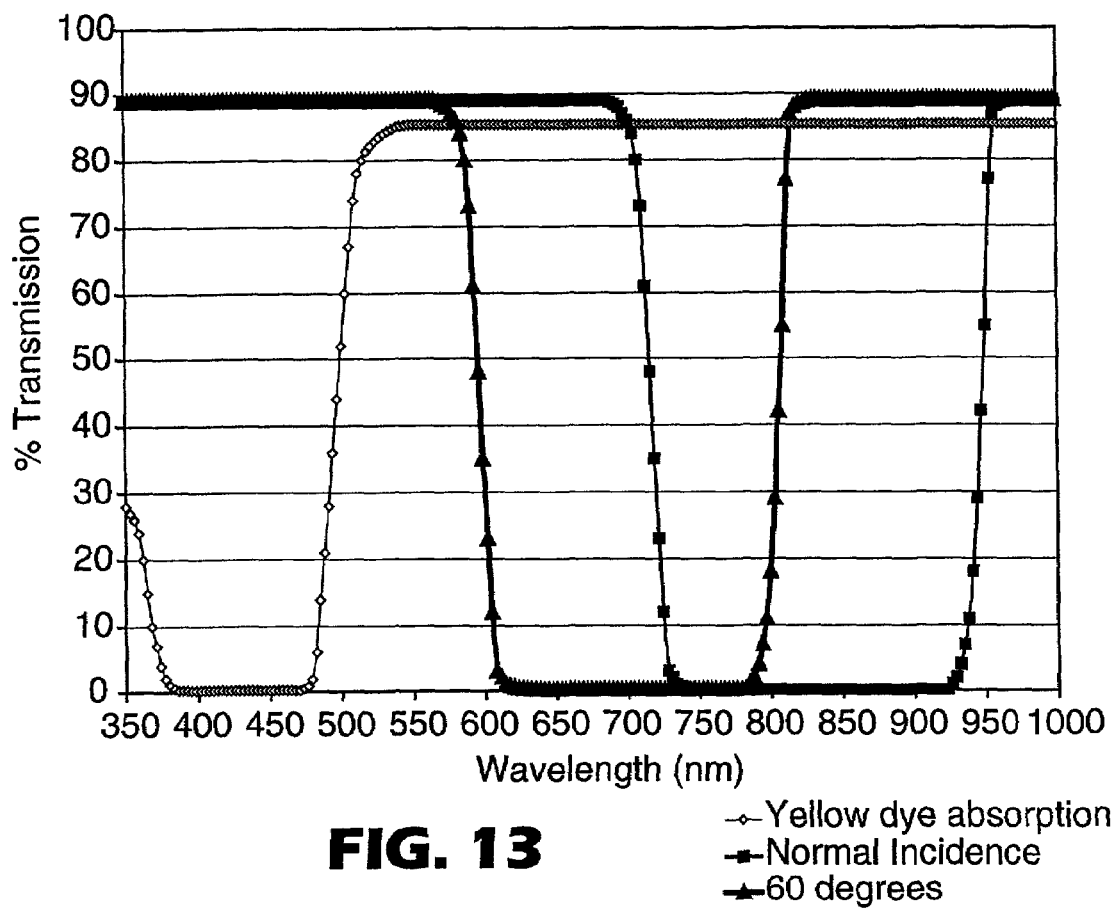
FIG. 13 is a graphical representation of % transmission vs. wavelength as described in Example 16.

A multilayer optical film could be constructed as described in Example 2 with the CoPHT containing a "yellow" dye that absorbs light in the 400–500 nm wavelength range. This "yellow dye" could be a polymerizable dye to prevent migration of the dye and changes in color with time. If the multi-layer optical film were designed with layer thicknesses to reflect light in the 730–900 nm wavelength range, the film would appear yellow at normal angle transmission and green at off angle transmissions as shown in FIG. 13.

Example 17

Green to Cyan

Figure 14:
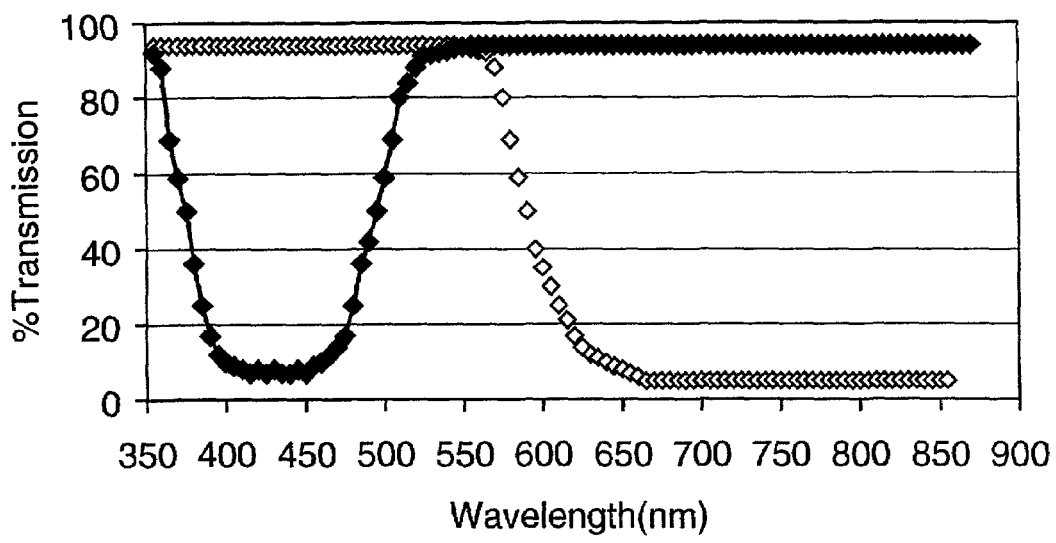
FIG. 14 is a graphical representation of % transmission vs. wavelength as described in Example 17.

A multilayer optical film could be constructed as described in Example 2 with the CoPHT containing a "cyan" dye that absorbs light in the 600–700 nm wavelength range. This "cyan" dye could be a polymerizable dye to prevent migration of the dye and changes in color with time. If the multilayer optical film were designed with layer thicknesses to reflect light in the 400–500 wavelength range, the film would appear green at normal angle transmissions and cyan at off angle transmissions as shown in FIG. 14.

Example 18

The cast film of Example 2 was uniaxially oriented at 125° C. at 1000%/s, following a pre-heating time of 30 seconds. It was drawn to 5 times its original length in the x direction while maintaining a constant width. The refractive indices generated were $n_x=1.65$, $n_y=1.54$, and $n_z=1.52$. The finished thickness of the film was 118 μm.

Figure 15:
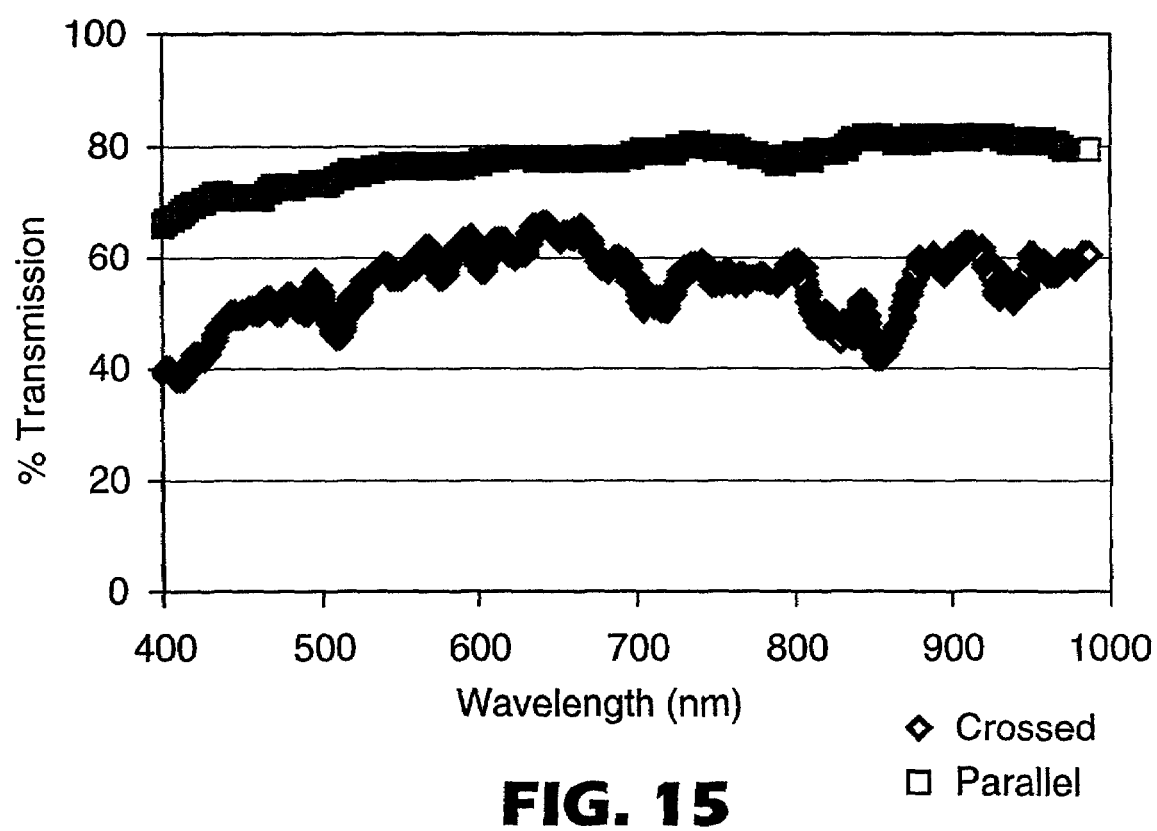
FIG. 15 is a graphical representation of % transmission vs. wavelength as described in Example 18.

The spectrum showed that some light was polarized by the film, as the transmission with parallel polarized light was about 80%, while the transmission for perpendicularly polarized light was only about 40% across the wavelengths of 500–1000 nm as depicted in FIG. 15.

To further illustrate the utility of this reflective polarizer film, it was subjected to 8 crumpling procedures in the crumple test. It came out in one piece and measured 543.5 μm thick. In contrast, a reflective polarizer comprising PEN and coPEN layers as described in U.S. Pat. No. 5,882,774 fractured into fibrous strands following only one crumple procedure.

Example 19

Olefin copolymers used as non-optical skin layers have been found to improve multi-layer optical film properties such as crumple recovery. A multilayer optical film was constructed with first optical layers created from PET, and second optical layers created from Admer SE810. The non-optical skin layers were created from a polypropylene: polyethylene copolymer, PP-8650. These materials were coextruded through a multiplayer melt manifold to create a stack of 61 alternating layers. A sample of this film was pre-heated to 100° C. for 30 sec., then biaxially oriented to 3.7×3.7. The samples were 75 μm thick before being put through crumple recovery testing as previously described. After 1 day under 323 g of weight, the samples were measured to rise 300 μm off the table, while similar samples with PET skin layers were measured to rise 750 μm off the table. Comparably, a 100 μm polypropylene Australian 1$ banknote was put through the same crumple test and was measured to rise 300 μm off the table. This unexpectedly demonstrates that a multilayer optical film made from PET high index layers having glass transition temperatures above room temperature and polyolefin low index layers having glass transition temperatures below room temperature, with the addition of polyolefin skins having glass transition temperatures below room temperature can have crumple recovery performance in a range useful for banknotes.

Various modifications and alterations of this invention will become apparent to those skilled in the art without departing from the scope and principles of this invention, and it should be understood that this invention is not to be unduly limited to the illustrative embodiments set forth hereinabove. All referenced publications and patents are incorporated herein by reference to the same extent as if each individual publication or patent was specifically and individually indicated to be incorporated by reference.

What is claimed:

1. An optical film, comprising:
  (a) a plurality of first optical layers, each first optical layer comprising high refractive index birefringent polymers, wherein the polymers in the first optical layers comprise the polymerization product of an aromatic carboxylated comonomer and a sufficient amount of a glycol comonomer derived from 50–100 mol % of diols having a carbon chain length of C6 or longer; and
  (b) a plurality of second optical layers disposed in a repeating sequence with the plurality of first optical layers, each second optical layer comprising low refractive index polymers, wherein such polymers have a Tg below room temperature.

2. The optical film according to claim 1, wherein the Tg of the high refractive birefringent index polymers and the Tg of the low refractive index polymers are in the range of −100° C. to 30° C.

3. The optical film according to claim 2, wherein the high refractive index birefringent polymers of this invention are polyesters, strain induced oriented near their melting points to induce birefringence, and are not glassy at room temperature.

4. The optical film according to claim 2, further comprising one or more skin layers.

5. A bank note comprising the optical film of claim 1.

6. A bank note, comprising:
  (a) an optical film, comprising:
    (i) a plurality of first optical layers, each first optical layer comprising high refractive index birefringent polymers, wherein the polymers in the first optical layers comprise carboxylate subunits and glycol subunits derived from 50–100 mol % of diols having a carbon chain length of C6 or longer; and
    (ii) a plurality of second optical layers disposed in a repeating sequence with the plurality of first optical layers, each second optical layer comprising low refractive index polymers, wherein such low refractive index polymers have a $T_{gL}$ below room temperature.

7. The bank note according to claim 6, wherein the high refractive index polymer is a polyester.

8. The bank note according to claim 6 or 7 further comprises one or more skin layers.

9. The bank note according to claim 8, wherein at least one of the skin layers is a polyolefin.

10. An optical film obtained by orienting a multi-layered film, wherein the film is comprised of:
(a) a plurality of first optical layers, each- first optical layer being oriented and comprising high refractive index birefringent polymers, wherein the polymers in the first optical layer comprise at least 50 mol % of terephthalate comonomer subunits and 50–100 mol % of glycol comonomer subunits, wherein the glycol subunits are derived from diols comprising a carbon chain length of C6 or longer; and
(b) a plurality of second optical layers disposed in a repeating sequence with the plurality of first optical layers, each second optical layer comprising low refractive index polymers, wherein such polymers have a $T_{gL}$ below room temperature, with the proviso that $T_{gH}$ is less than $T_{gL}$.

11. A bank note comprising the optical film according to claims 1 or 10.

12. The bank note according to claim 6 further comprising one or more covert security features and/or one or more overt security features.

13. The bank note according to claim 12, wherein one overt security feature is the addition of a color shifting film to at least one portion of the bank note.

14. The bank note according to claim 12, wherein one overt security feature is the inclusion of a security thread comprised of a color shifting film.

15. The bank note according claim 12, wherein any of the covert or overt security features are selected from the group consisting of one or more color shifting films, security threads, planchettes, polarizing films, color shifting inks, covert inks, magnetic inks, transparent windows containing color shifting film or ink, transparent windows containing opacifying coatings on one or both sides of the transparent window, or holographic embossing or hot stamping.

16. The optical film according to claim 10, wherein the high refractive index birefringent polymer comprises (i) carboxylate subunits derived from 90–100 mol % terephthalic or naphthalic acid or lower alkyl esters thereof and 0–10 mol % sebacic acid or lower alkyl esters thereof and (ii) glycol subunits derived from 90–100 mol % 1,6 hexane diol, 1–10 mol % triethylene glycol, and 0.01–10 mol % branching comonomer molecules.

17. The optical film according to claim 10, wherein the high refractive index birefringent polymer comprises (i) carboxylate subunits derived from 90–100 mol % terephthalic or naphthalic acid or lower alkyl esters thereof and 0–10 mol % sebacic acid or lower alkyl esters thereof. and (ii) glycol subunits derived from 90–100 mol % 1,6 hexane diol, 1–10 mol % 2-butyl 2-ethyl 1,3 propanediol, and 0.01–10 mol % branching comonomer molecules.

18. The optical film according to claim 10, wherein the high refractive index birefringent polymer comprises (i) carboxylate subunits derived from 90–100 mol % terephthalic or naphthalic acid or lower alkyl esters thereof and 0–10 mol % sebacic acid or lower alkyl esters thereof, and (ii) glycol subunits derived from 90–100 mol % 1,6 hexane diol, 1–10 mol % neopentyl glycol, and 0.01–10 mol % branching comonomer molecules.

19. The optical film according to claim 10, wherein the high refractive index birefringent polymer comprises (i) carboxylate subunits derived from 90–100 mol % terephthalic acid or lower alkyl esters thereof and 0–10 mol % sebacic acid or lower alkyl esters thereof: and (ii) glycol subunits derived from 90–100 mol % 1,6 hexane diol, 1–10 mol % 2-butyl 2-ethyl 1,3 propanediol, 1–10 mol % TEG, and 0.01–10 mol % branching comonomer molecules.

20. The optical film according to claim 1, wherein the high refractive index birefringent polymer comprises (i) carboxylate subunits derived from 50–100 mol % naphthalate subunits and 0–50 mol % adipate, azelate, sebacate, or longer chain dicarboxylate comonomers, and (ii) glycol subunits derived from 50–100 mol % 1,6 hexane diol, 0–50 mol % C7 and longer chain diols, 0–20 mol % TEG, 0–20 mol % neopentyl glycol, 0–20 mol % 2-butyl 2-ethyl 1,3 propanediol, and 0.01–10 mol % branching comonomers as glycol comonomer subunits.

21. The optical film according to claims 1 or 10, wherein the optical film has a crease recovery of at least 140° after creasing under a 500 gm load over a 0.19 mm radius.

22. The bank note of claim 6, wherein the bank note has a crease recovery of at least 140° after creasing under a 500 gm load over a 0.19 mm radius.

23. The optical film according to claims 1 or 10, wherein the optical film has a ratio of crumpled to uncrumpled height of less than 8, following 24 hour recovery under 969 gm load for a 67 mm square sample.

24. The bank note of claim 6, wherein the bank note has a ratio of crumpled to uncrumpled height of less than 8, following 24 hour recovery under 969 gm load for a 67 mm square sample.

25. The optical film of claims 1 or 10, wherein the optical film has a normalized propagated tear resistance of greater than 8 N/mm.

26. The bank note of claim 6, wherein the bank note has a normalized propagated tear resistance of greater than 8 N/mm.

27. The optical films of claim 1 or 10, wherein the films or a laminate comprising the films contains inner regions of white, black, opaque colored or transparent colored areas.

28. The film of claim 27, wherein embossing of the film brings out contrast to different regions of the film.

29. A document of value incorporating the film of claim 27.

30. A document of value comprising at least one security thread using the film according to claim 1 or 10.

31. The document of value according to claim 30, wherein the security thread contains a holographic image, a printed image, a topographical feature or any combination thereof.

32. A multi-layer optical film of claim 1 with an opaque center core layer that is clear to reveal the color of the opaque center core layer, and upon embossing to specific optical layer thicknesses, reflects a range of light specified by the thickness of the embossed optical layers in the embossed area.

33. The multi-layer optical film of claim 32 where the opaque center core layer is a polymer filled with a pigment or dye.

34. The multi-layer optical film of claim 27 wherein the inner region is a coating such that the coating is between two laminated multi-layer optical films.

35. A bank note of claim 1, 6 or 10 wherein the change in stiffness due to the proximity of the glass transitions of the polymer(s) to human body, room and ice water temperatures allow for ready human or machine detection of the change in stiffness or sonic frequency of vibration.

36. An optical film, comprising:
(a) a plurality of first optical layers, each first optical layer comprising high refractive index birefringent polymers, wherein the polymers in the first optical layer comprise at least 50 mol % of terephthalate comonomer subunits and 50–100 mol % of glycol comonomer subunits, wherein the glycol subunits are derived from diols having a carbon chain length of C6 or longer and wherein the refractive indices of the polymers in the first optical layer exhibit a strain induced birefringence between at least one in-plane axis and the axis normal to the film plane of at least 0.05; and
(b) a plurality of second optical layers disposed in a repeating sequence with the plurality of first optical layers, each second optical layer comprising low refractive index polymers, wherein such polymers have a Tg below room temperature.

* * * * *

UNITED STATES PATENT AND TRADEMARK OFFICE
CERTIFICATE OF CORRECTION

PATENT NO. : 7,052,762 B2  
APPLICATION NO. : 10/139893  
DATED : May 30, 2006  
INVENTOR(S) : Timothy J. Hebrink It is certified that error appears in the above-identified patent and that said Letters Patent is hereby corrected as shown below:

Title Page  
Col. 1, line 1 (TITLE) delete "TG" and insert -- Tg --, therefor.

Column 1  
Line 1 (TITLE) delete "TG" and insert -- Tg --, therefor.  
Line 57 (APPROXIMATELY), before "6,045,894" delete "U.S. Pat. No.".

Column 7  
Line 39, delete "theological" and insert -- rheological --, therefor.

Column 10  
Line 20, delete "$(n_1 d_2 + n_2 d_2)$" and insert -- $(n_1 d_1 + n_2 d_2)$ --, therefor.

Column 12  
Line 57, after "having" insert -- a --.

Column 15  
Line 21, delete "Theological" and insert -- rheological --, therefor.

Column 24  
Line 52 (APPROXIMATELY), delete "orthoganol" and insert -- orthogonal --, therefor.

Column 41  
Line 56, in Claim 17, delete "thereof. and" and insert -- thereof and --, therefor.

UNITED STATES PATENT AND TRADEMARK OFFICE
CERTIFICATE OF CORRECTION

PATENT NO.         : 7,052,762 B2
APPLICATION NO.    : 10/139893
DATED              : May 30, 2006
INVENTOR(S)        : Timothy J. Hebrink It is certified that error appears in the above-identified patent and that said Letters Patent is hereby corrected as shown below:

<u>Column 41</u>
Line 64, in Claim 18, delete "thereof, and" and insert -- thereof and --, therefor.

<u>Column 42</u>
Line 5, in Claim 19, delete "thereof: and" and insert -- thereof and --, therefor.
Line 64, in Claim 35, delete "transitions" and insert -- transition(s) --, therefor.

Signed and Sealed this

Twenty-sixth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,052,762 B2  Page 1 of 1
APPLICATION NO. : 10/139893
DATED : May 30, 2006
INVENTOR(S) : Timothy J. Hebrink It is certified that error appears in the above-identified patent and that said Letters Patent is hereby corrected as shown below:

Column 40,
Line 33, delete "a sufficient amount of".
Line 66, delete "$T_{gL}$" and insert -- $T_g$ --.

Column 41,
Line 25, delete "claims 1 or".
Line 26, after "claim 6" insert -- or 11 --.

Column 42,
Line 42, after the first occurrence of "The" insert -- optical --.
Line 44, after "the" insert -- optical --.
Line 47, after "the" insert -- optical --.
Line 51, delete "A multi-layer" and insert -- The --.
Line 57, delete "multi-layer".
Line 60, delete "multi-layer".
Line 63, delete "claim 1, 6 or 10" and insert -- claim 6. --.

Signed and Sealed this

Second Day of February, 2010

David J. Kappos
*Director of the United States Patent and Trademark Office*